United States Patent
Schwarte et al.

(10) Patent No.: US 7,855,266 B2
(45) Date of Patent: Dec. 21, 2010

(54) METHOD FOR MULTILAYER COATINGS WITH SELF-CROSSLINKING GRAFT POLYURETHANE COPOLYMERS, SELF-CROSSLINKING POLYURETHANES AND GRAFT COPOLYMERS THEREOF

(75) Inventors: Stephan Schwarte, Emsdetten (DE); Egon Wegner, Veitshöchheim (DE); Harald Angermüller, Würzburg (DE)

(73) Assignee: BASF Coatings AG, Munster (DE)

( * ) Notice: Subject to any disclaimer, the term of this patent is extended or adjusted under 35 U.S.C. 154(b) by 83 days.

(21) Appl. No.: 11/620,146

(22) Filed: Jan. 5, 2007

(65) Prior Publication Data
US 2007/0106019 A1 May 10, 2007

Related U.S. Application Data

(62) Division of application No. 10/130,026, filed on May 1, 2002, now Pat. No. 7,198,824.

(51) Int. Cl.
*C08G 18/32* (2006.01)
*C08G 18/67* (2006.01)
*C08G 18/66* (2006.01)

(52) U.S. Cl. .................... 528/45; 525/453; 525/455; 528/67; 528/69; 528/75

(58) Field of Classification Search ............... 525/452; 528/45, 75
See application file for complete search history.

(56) References Cited

U.S. PATENT DOCUMENTS

| | | | | |
|---|---|---|---|---|
| 3,043,807 A * | 7/1962 | Suyder | | 528/65 |
| 3,552,999 A * | 1/1971 | Shima et al. | | 428/423.7 |
| 3,856,757 A * | 12/1974 | Satomura | | 528/75 |
| 3,871,908 A * | 3/1975 | Spoor et al. | | 428/423.1 |
| 4,268,542 A | 5/1981 | Sakakibara et al. | | |
| 4,367,302 A * | 1/1983 | Le Roy et al. | | 524/104 |
| 4,408,020 A * | 10/1983 | Kolycheck | | 525/415 |
| 4,443,490 A * | 4/1984 | Nakajima et al. | | 427/500 |
| 4,444,954 A | 4/1984 | Mels et al. | | |
| 4,446,286 A * | 5/1984 | Kolycheck et al. | | 525/455 |
| 4,467,078 A * | 8/1984 | Kolycheck et al. | | 525/455 |
| 4,675,234 A | 6/1987 | Sachs et al. | | |
| 4,683,280 A * | 7/1987 | Ukachi et al. | | 528/71 |
| 4,727,126 A * | 2/1988 | Chen | | 526/302 |
| 4,754,014 A | 6/1988 | Ryntz et al. | | |
| 4,762,902 A * | 8/1988 | Murphy | | 528/75 |
| 4,980,108 A * | 12/1990 | Suzuki et al. | | 264/134 |
| 5,028,683 A * | 7/1991 | Martens et al. | | 528/75 |
| 5,356,669 A | 10/1994 | Rehfuss et al. | | |
| 5,474,811 A | 12/1995 | Rehfuss et al. | | |
| 5,605,965 A | 2/1997 | Rehfuss et al. | | |
| 5,905,132 A * | 5/1999 | Wegner et al. | | 528/45 |
| 6,001,424 A * | 12/1999 | Lettmann et al. | | 427/407.1 |
| 6,063,861 A | 5/2000 | Irle et al. | | |
| 6,607,788 B1 * | 8/2003 | Wegner et al. | | 427/388.4 |

FOREIGN PATENT DOCUMENTS

| | | |
|---|---|---|
| DE | 1071241 B | 12/1959 |
| DE | 1618795 A | 4/1972 |
| DE | 1793785 A | 10/1974 |
| DE | 3706095 A1 | 8/1987 |
| DE | 3636183 A1 | 3/1988 |
| DE | 3807571 A1 | 9/1988 |
| DE | 4009858 A1 | 10/1991 |
| DE | 4204518 A1 | 8/1993 |
| DE | 4222194 A1 | 1/1994 |

(Continued)

OTHER PUBLICATIONS

English Translation of the International Preliminary Examination Report for International application No. PCT/EP00/09850 dated Feb. 11, 2002.

(Continued)

*Primary Examiner*—Randy Gulakowski
*Assistant Examiner*—Mike Dollinger
(74) *Attorney, Agent, or Firm*—Cantor Colburn LLP

(57) ABSTRACT

The invention relates to a method for producing chromophore and/or effect giving multilayer lacquers according to the wet-on-wet method. A water base lacquer is applied which contains at least one graft copolymer containing (A) at least one (meth)acrylate copolymer and (B) at least one polyurethane. The graft copolymer can be produced by (1) dispersing at least one hydrophilic or hydrophobic self cross-linking polyurethane (B) with a statistical average of at least one terminal and/or at least one lateral olefinically unsaturated group and at least one blocked isocyanate group per molecule in an aqueous medium. (2) A mixture of a at least one monomer (a1) with at least one isocyanate reactive functional group at last one monomer (a2) that can be copolymerised therewith is subsequently radically copolymerised in an emulsion in the presence of the polyurethane (B) or the polyurethanes (B). A powder slurry transparent lacquer layer is added to the resulting base lacquer layer. The base lacquer layer and the transparent lacquer layer are hardened together. The invention also relates to novel hydrophilic or hydrophobic self cross-linking polyurethanes (B) with at least one lateral and/or at least one terminal olefinically unsaturated group and at least one lateral blocked isocyanate group per molecule and graft copolymers on the basis of said polyurethanes (B) as well as the use thereof.

15 Claims, No Drawings

FOREIGN PATENT DOCUMENTS

| | | |
|---|---|---|
| DE | 4414032 A1 | 10/1995 |
| DE | 4421823 A1 | 1/1996 |
| DE | 4437535 A1 | 4/1996 |
| DE | 19613547 A1 | 11/1996 |
| DE | 19645761 A1 | 5/1998 |
| DE | 19722862 C1 | 1/1999 |
| DE | 19736535 C1 | 1/1999 |
| DE | 19753222 A1 | 6/1999 |
| EP | 0008127 A1 | 2/1980 |
| EP | 0089497 A2 | 9/1983 |
| EP | 0249201 A2 | 12/1987 |
| EP | 0276501 A2 | 8/1988 |
| EP | 0331409 A2 | 9/1989 |
| EP | 0354261 A1 | 2/1990 |
| EP | 0358153 B1 | 3/1990 |
| EP | 0424705 A2 | 5/1991 |
| EP | 0498583 A1 | 8/1992 |
| EP | 0521928 B1 | 1/1993 |
| EP | 0522419 A1 | 1/1993 |
| EP | 0522420 A2 | 1/1993 |
| EP | 0540884 A1 | 5/1993 |
| EP | 0568967 A2 | 11/1993 |
| EP | 0594068 A1 | 4/1994 |
| EP | 0594071 A1 | 4/1994 |
| EP | 0594142 A1 | 4/1994 |
| EP | 0596460 A2 | 5/1994 |
| EP | 0604992 A1 | 7/1994 |
| EP | 0608021 A1 | 7/1994 |
| EP | 0730613 B1 | 9/1996 |
| EP | 0919579 A1 | 6/1999 |
| GB | 1220717 A | 1/1971 |
| JP | 11131010 A * | 5/1999 |
| WO | WO9222615 A1 | 12/1992 |
| WO | WO9410211 A1 | 5/1994 |
| WO | WO9410212 A1 | 5/1994 |
| WO | WO9410213 A1 | 5/1994 |
| WO | WO9422968 A1 | 10/1994 |
| WO | WO9422969 A1 | 10/1994 |
| WO | WO9632452 A1 | 10/1996 |
| WO | WO9712495 A1 | 4/1997 |
| WO | WO9749745 A1 | 12/1997 |
| WO | WO9749747 A1 | 12/1997 |
| WO | WO99/10439 A1 | 3/1999 |

OTHER PUBLICATIONS

International Search Report for International application No. PCT/EP00/09850 dated Feb. 2, 2001.

Database WPI; Section Ch. Week 199914, Derwent Publications Ltd., London, GB; AN 1999-162199 XP002157676, & JP11020107A (Reijin Lte), Jan. 26, 1999, Summary.

* cited by examiner

METHOD FOR MULTILAYER COATINGS WITH SELF-CROSSLINKING GRAFT POLYURETHANE COPOLYMERS, SELF-CROSSLINKING POLYURETHANES AND GRAFT COPOLYMERS THEREOF

CROSS REFERENCE TO RELATED APPLICATIONS

This application is a Divisional Application of U.S. Ser. No. 10/130,026, filed May 1, 2002.

The present invention relates to a novel process for producing multicoat color and/or effect paint systems using self-crosslinking polyurethane graft copolymers. The present invention also relates to novel self-crosslinking polyurethanes and their novel self-crosslinking graft copolymers. The present invention further relates to the use of the novel self-crosslinking polyurethanes and of their novel self-crosslinking graft copolymers for preparing self-crosslinking coating materials, adhesives, and sealing compounds.

In the context of the present invention, the term "self-crosslinking" denotes the property of a binder (regarding the term cf. Römpp Lexikon Lacke und Druckfarben, Georg Thieme Verlag, Stuttgart, New York, 1998, "Binders", pages 73 and 74) to undergo crosslinking reactions with itself. A precondition for this is that the binders already contain both types of complementary reactive functional groups necessary for crosslinking. Externally crosslinking, on the other hand, is used to denote those coating materials, adhesives, and sealing compounds in which one type of the complementary reactive functional groups is present in the binder and the other type in a curing or crosslinking agent. For further details on this point, refer to Römpp Lexikon Lacke und Druckfarben, Georg Thieme Verlag, Stuttgart, New York, 1998, "Curing", pages 274 to 276, especially page 275, bottom.

German patent application DE-A-196 45 761 discloses hydrophilic self-crosslinking polyurethanes which contain olefinically unsaturated groups and terminal blocked isocyanate groups. The blocking agents, however, are not specified therein. These known hydrophilic self-crosslinking polyurethanes are used for preparing graft copolymers by the emulsion polymerization method. The resulting dispersions of the graft copolymers are used for preparing aqueous basecoat materials and adhesives. The examples, however, do not disclose any self-crosslinking polyurethanes and their graft copolymers, but instead only externally crosslinking polyurethanes and copolymers. Nor does the patent application address the production of multicoat color and/or effect paint systems by the wet-on-wet technique, in which basecoat films are overcoated with clearcoat films and then both films are cured together.

German patent DE-C-197 22 862 discloses an externally crosslinking graft copolymer obtainable by polymerizing olefinically unsaturated monomers in a dispersion of an olefinically unsaturated polyurethane containing hydrophilic functional groups and having on average from 0.05 to 1.1 pendant and/or terminal polymerizable double bonds per molecule.

The known externally crosslinking graft copolymers of DE-C-197 22 862 are in the form of primary dispersions and are very highly suitable for preparing aqueous externally crosslinking coating materials, especially aqueous basecoat materials. The externally crosslinking aqueous basecoat materials may be used with advantage for producing multicoat color and/or effect paint systems by the wet-on-wet technique.

These known aqueous basecoat materials are crosslinked using hydrophobic crosslinking agents which must be incorporated into the aqueous coating materials by way of cosolvents or emulsifiers. Owing to their hydrophobic properties and the resultant comparatively poor dispersion in the aqueous coating material, it is necessary to incorporate larger amounts of crosslinking agents than would be necessary per se for sufficient crosslinking and adhesion of the resulting coating, particularly of the aqueous basecoat material. Moreover, the cosolvents again raise the emission of organic substances on drying and curing, which the use of aqueous coating materials was intended specifically to decrease or prevent entirely. Moreover, residues of crosslinking agents, emulsifiers, and cosolvents have adverse effects on the so-called flash-off behavior of the known aqueous basecoat films, which is manifested in a reduction in the coat thickness above which cracking (mud cracking) and popping marks appear. Although it might be possible to a certain extent to use hydrophilic crosslinking agents to remove the disadvantages associated with the use of the cosolvents and emulsifiers, there would then be a fall in the condensation resistance and weathering stability of the corresponding coatings.

In the context of the present invention, the property of hydrophilicity denotes the constitutional property of a molecule or functional group to penetrate into the aqueous phase or to remain therein. Accordingly, in the context of the present invention, the property of the hydrophobicity denotes the constitutional property of a molecule or functional group to behave exophilically with respect to water, i.e., to tend not to penetrate into water or to tend to depart the aqueous phase. For further details, refer to Römpp Lexikon Lacke und Druckfarben, Georg Thieme Verlag, Stuttgart, New York, 1998, "Hydrophilicity", "Hydrophobicity", pages 294 and 295.

The problems depicted above are exacerbated if the known aqueous basecoat materials are used together with powder slurry clearcoat materials for producing multicoat color and/or effect paint systems.

The German patent application with DE-A-197 53 222 discloses a primary dispersion of a self-crosslinking graft copolymer which is preparable by free-radical emulsion polymerization of vinyl monomers, of which at least one carries an acetoacetoxy group, in the presence of a hydrophilic, saturated polyurethane containing (potentially) anionic groups. The resultant graft copolymer becomes self-crosslinking by the addition of polyamines such as diethylene triamine which are bonded ionically to the binder, i.e., the graft copolymer. Crosslinking proceeds even at room temperature with the formation of an enamine, which severely impairs the storage stability. The known primary dispersion is used for preparing clearcoat materials. Whether it is also suitable for the preparation of aqueous basecoat materials, DE-A-197 53 222 does not reveal. The high level of polyamines gives cause for concern that these known primary dispersions might yellow at temperatures such as are commonly employed in the production of multicoat color and/or effect paint systems for automobile bodies.

Owing to the use of saturated polyurethanes, moreover, problems associated with inadequate grafting activity occur here. Accordingly, a large part of the monomers to be grafted on may form separate homopolymers and/or copolymers alongside the polyurethane, which may adversely affect the performance properties of the graft copolymers and of the coating materials, adhesives, and sealing compounds prepared using them.

It is an object of the present invention to find a novel wet-on-wet process for producing multicoat color and/or effect paint systems on primed or unprimed substrates that no longer has the disadvantages of the prior art but which instead, even when using powder slurry clearcoat materials, gives multicoat paint systems which exhibit no cracking (mud cracking), popping marks or pinholes. Moreover, the resultant multicoat paint systems ought to have an outstanding overall appearance and also high chemical stability, yellowing resistance, and weathering stability. They should at least display no delamination of the coats following the waterjet test. All of these advantages should be achievable without having to accept an increase in the emission of organic compounds.

It is another object of the present invention to provide novel self-crosslinking olefinically unsaturated polyurethanes which can be prepared purposively and simply without the risk of product damage, and which constitute outstanding graft bases for olefinically unsaturated monomers.

Yet another object of the present invention is to find novel self-crosslinking graft copolymers, particularly in the form of primary dispersions, which can be prepared simply, purposively, and without the risk of product damage.

Still another object of the present invention is to provide novel aqueous and nonaqueous self-crosslinking coating materials, adhesives, and sealing compounds based on polyurethane and having very good performance properties. The intention in particular is to provide novel self-crosslinking coating materials, especially novel aqueous self-crosslinking coating materials, specifically novel self-crosslinking aqueous basecoat materials which no longer have the disadvantages of the prior art but are instead outstandingly suitable for application by the wet-on-wet technique. In this context, even when using powder clearcoat slurries, there ought to be no cracking (mud cracking) or popping marks or pinholes. The novel coating materials ought to have very good storage stability and outstanding application properties, such as very good leveling and very little tendency to run even at high film thicknesses. The resultant multicoat paint systems ought to have an outstanding overall appearance and also high chemical stability, yellowing resistance, and weathering stability. Moreover, no delamination of the coats following the waterjet test should occur. All of these advantages should be achievable without having to accept an increase in the emission of organic compounds.

Found accordingly has been the novel process for producing multicoat color and/or effect paint systems on primed or unprimed substrates, which comprises the following process steps:

(I) preparing a basecoat film by applying an aqueous basecoat material to
   (I.1) the substrate,
   (I.2) a thermally cured surfacer coat or
   (I.3) a dry surfacer film,
(II) drying the basecoat film,
(III) preparing a clearcoat film by applying a powder slurry clearcoat material to the basecoat film, and
(IV) jointly curing the basecoat film (II) and the clearcoat film (III) or the surfacer film (I.3), the basecoat film (II), and the clearcoat film (III), to give the basecoat and the clearcoat and also, where appropriate, the surfacer coat (wet-on-wet technique);

using an aqueous basecoat material which comprises at least one graft copolymer comprising (A) at least one (meth)acrylate copolymer and (B) at least one polyurethane and is preparable by 1) dispersing at least one hydrophilic or hydrophobic self-crosslinking polyurethane (B) containing on average per molecule at least one pendant and/or at least one terminal olefinically unsaturated group and at least one blocked isocyanate group in an aqueous medium and then (2) subjecting a mixture of at least one monomer (a1) containing at least one isocyanate-reactive functional group and at least one monomer (a2) copolymerizable therewith to free-radical copolymerization in emulsion in the presence of the polyurethane (B) or of the polyurethanes (B).

In the text below, the novel process for producing multicoat color and/or effect paint systems on primed or unprimed substrates is referred to for the sake of brevity as "process of the invention".

Also found has been the novel hydrophilic or hydrophobic self-crosslinking polyurethane (B) containing on average per molecule at least one pendant and/or at least one terminal olefinically unsaturated group and at least one pendant blocked isocyanate group and preparable by reacting (1) a polyurethane prepolymer (B1) containing on average per molecule at least one pendant and/or at least one terminal olefinically unsaturated group, at least one pendant blocked isocyanate group, and at least one free isocyanate group, preparable by reacting at least
   (B1.1) at least one polyisocyanate,
   (B1.2) at least one saturated and/or olefinically unsaturated polyol of relatively high molecular weight and/or of low molecular weight,
   (B1.3) at least one compound containing at least one blocked isocyanate group and at least two isocyanate-reactive functional groups
   (B1.4) at least one compound containing at least one olefinically unsaturated group and at least two isocyanate-reactive functional groups
   with one another in one stage or in two or more stages, so that on average per molecule there remains at least one free isocyanate group;
   with (2) at least one blocking agent (B1.7) and/or at least one compound (B1.8) containing at least two isocyanate-reactive functional groups, so that free isocyanate groups are no longer detectable.

In the text below, the novel hydrophilic or hydrophobic self-crosslinking polyurethane (B) is referred to as "polyurethane of the invention".

Not least there has been found the novel graft copolymer which comprises (A) at least one (meth)acrylate copolymer and (B) at least one polyurethane and which is preparable by (1) dispersing at least one hydrophilic or hydrophobic self-crosslinking polyurethane (B) containing on average per molecule at least one pendant and/or at least one terminal olefinically unsaturated group and at least one pendant blocked isocyanate group in an aqueous medium and then (2) subjecting a mixture of at least one monomer (a1) containing at least one isocyanate-reactive functional group and at least one monomer (a2) copolymerizable therewith to free-radical copolymerization in emulsion in the presence of the polyurethane (B) or of the polyurethanes (B).

In the text below, the novel graft copolymer is referred to as "graft copolymer of the invention".

Also found have been the novel adhesives, sealing compounds, and coating materials, especially surface coating materials and in particular aqueous surface coating materials, specifically aqueous basecoat materials, which comprise at least one polyurethane (B) of the invention and/or at least one graft copolymer of the invention which are referred to below as adhesives, sealing compounds, and coating materials of the invention.

Further subject matter of the invention will emerge from the description.

In the light of the prior art it was surprising and unforeseeable for the skilled worker that the complex problem on which the present invention was based could be solved by means of the process of the invention, the polyurethanes (B) of the invention and/or the graft copolymers of the invention, the core of the invention lying, surprisingly, in the use of self-crosslinking polyurethanes and their graft copolymers. A particular surprise was that the polyurethanes (B) of the invention and the graft copolymers of the invention could be prepared simply and purposively without any damage to the products of the invention. Yet another surprise was the extremely broad usefulness of the process of the invention, the polyurethanes (B) of the invention and the graft copolymers of the invention. A surprise not least was the high storage stability of the polyurethanes of the invention and of the graft copolymers of the invention, even under extreme climatic conditions such as tropical conditions or particularly hot summer's days. Completely impossible to foresee was that, in particular, the graft copolymers of the invention would give aqueous basecoat materials which can be processed with powder clearcoat slurries by the wet-on-wet technique to give outstanding multicoat color and/or effect paint systems without cracking (mud cracking), popping marks or pinholes, or delamination of the coats following the waterjet test.

The process of the invention is used to produce multicoat color and/or effect paint systems on primed or unprimed substrates.

Suitable substrates are all surfaces for coating which are not damaged by curing of the coatings present thereon using heat; they are, for example, metals, plastics, wood, ceramic, stone, textile, fiber assemblies, leather, glass, glass fibers, glass wool and rock wool, mineral-bound and resin-bound building materials, such as plasterboard and cement slabs or roof shingles, and composites of these materials. Accordingly, the process of the invention is also suitable for applications outside that of automobile finishing. In this context it is particularly suitable for the coating of furniture and for industrial coating, including coil coating, container coating, and the impregnation or coating of electrical components. In the context of industrial coatings it is suitable for coating virtually all parts for domestic or industrial use, such as radiators, domestic appliances, small metal parts such as screws and nuts, hubcaps, wheel rims, packaging, or electrical components such as motor windings or transformer windings.

In the case of electrically conductive substrates it is possible to use primers which are produced in a customary and known manner from electrodeposition coating materials. Both anodic and cathodic electrodeposition coating materials are suitable for this purpose, but especially cathodics.

With the process of the invention it is also possible to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations according to DIN 7728T1). The plastics for coating may of course also be polymer blends, modified plastics or fiber-reinforced plastics. The plastics normally used in constructing vehicles, especially motor vehicles, can also be used.

In the case of nonfunctionalized and/or apolar substrate surfaces, these may be subjected prior to coating in a known manner to a pretreatment, such as with a plasma or by flaming, or may be provided with a water-based primer.

In accordance with the invention, in a first process step an aqueous basecoat material is applied to the substrate, to a surfacer coat applied previously to the substrate and thermally cured, or to a surfacer film applied previously to the substrate and dried, so resulting in the basecoat film.

The aqueous basecoat material may be applied by all customary application methods, such as spraying, knifecoating, brushing, flowcoating, dipping, impregnating, trickling, or rolling, for example. The substrate to be coated may itself be at rest, with the application equipment or unit being moved. Alternatively, the substrate to be coated, especially a coil, may be moved, with the application unit being at rest relative to the substrate or being moved appropriately.

Preference is given to the use of spray application methods, such as compressed-air spraying, airless spraying, high-speed rotation, electrostatic spray application (ESTA), alone or in conjunction with hot spray applications such as hot-air spraying, for example. Application may be conducted at temperatures of max. 70 to 80° C., so that suitable application viscosities are achieved without the short-term thermal stress being accompanied by any change in or damage to the aqueous basecoat material and its overspray, which may be intended for reprocessing. For instance, hot spraying may be configured such that the aqueous basecoat material is heated in the spray nozzle for only a very short time, or is heated just a short way upstream of the spray nozzle.

The spray booth used for the application may be operated, for example, with an optionally temperature-controllable circulation, which is operated with an appropriate absorption medium for the overspray, an example being the aqueous basecoat material itself.

Of course, these processes may also be used for applying the powder slurry clearcoat materials and also, where appropriate, the surfacers.

In accordance with the invention, the basecoat film is dried but not crosslinked.

In a further process step, a powder slurry clearcoat material is applied to the dried basecoat film, so giving the clearcoat film. In this context, the application methods described above are employed.

As is known, this process is referred to by those in the art also as wet-on-wet technique.

The surfacer film (where used), basecoat film, and clearcoat film are together cured thermally.

Full curing may take place after a certain rest time. Its duration may be from 30 s to 2 h, preferably from 1 min to 1 h, and in particular from 1 min to 45 min. The rest time serves, for example, for the coating films to flow and undergo devolatilization, or for the evaporation of volatile constituents such as solvents. The rest time may be assisted and/or shortened by the application of elevated temperatures of up to 90° C. and/or by a reduced atmospheric humidity <10 g water/kg air, particularly <5 g/kg air, provided no damage or alteration to the paint films occurs in this case, such as premature complete crosslinking.

The thermal cure has no special features in terms of its method but instead takes place in accordance with the customary and known methods such as heating in a forced air oven or exposure to IR lamps. This thermal cure may also take place in stages. The thermal cure takes place advantageously at a temperature of from 50 to 100° C., with particular preference 60 to 100° C., and in particular 80 to 100° C. for a period of from 1 min up to 2 h, with particular preference from 2 min up to 1 h, and in particular from 3 min to 45 min. Where substrates are used which have high thermal load bearing capacities, thermal crosslinking may also be conducted at temperatures above 100° C. In this case it is generally advisable not to exceed temperatures of 180° C., preferably 160° C., and in particular 155° C.

In the case of the clearcoat, curing may also take place with actinic radiation or both thermally and with actinic radiation (dual cure), depending on the powder slurry clearcoat material used. Suitable actinic radiation is electromagnetic radiation such as near infrared (NIR) light, visible light, UV radiation or x-rays and/or corpuscular radiation such as electron beams. Alternatively, exposure to actinic radiation may also serve for aftertreatment of the thermally cured clearcoat.

Furthermore, the clearcoat may additionally be coated further with at least one other clearcoat, for example, an organically modified ceramic layer, thereby making it possible to improve significantly the mar resistance of the multicoat color and/or effect paint system.

In general, the surfacer film (where used), basecoat film, and clearcoat film are applied in a wet film thickness such that they cure to give coats having the coat thicknesses which are necessary and advantageous for their functions. In the case of the surfacer coat, this coat thickness is from 10 to 150, preferably from 10 to 120, with particular preference from 10 to 100, and in particular from 10 to 90 μm; in the case of the basecoat it is from 5 to 50, preferably from 5 to 40, with particular preference from 5 to 30, and in particular from 10 to 25 μm; and in the case of the clearcoat it is from 10 to 100, preferably from 15 to 80, with particular preference from 20 to 70, and in particular from 25 to 60 μm.

The multicoat color and/or effect paint systems produced by the process of the invention have a variable structure.

In a first preferred variant of the multicoat paint system (1) the color and/or effect basecoat and (2) the clearcoat lie above one another in the stated sequence. This preferred variant is employed in particular in the context of coating plastics.

In the second preferred variant of the multicoat paint system, (1) a surfacer coat which absorbs mechanical energy, (2) the color and/or effect basecoat, and (3) the clearcoat lie above one another in the stated sequence. This variant is employed in particular in the context of automobile finish.

For the process of the invention it is essential that use is made here of an aqueous basecoat material which comprises at least one specific graft copolymer.

The graft copolymer for use in accordance with the invention comprises at least one (meth)acrylate copolymer (A) and at least one polyurethane (B) grafted therewith.

The polyurethanes (B) for use in accordance with the invention for preparing the graft copolymers are hydrophilic or hydrophobic in the aforementioned sense. In respect of their use for preparing the graft copolymers of the invention, the hydrophilic polyurethanes (B) of the invention provide advantages and are therefore used with preference. Furthermore, the polyurethanes (B) for use in accordance with the invention are self-crosslinking in the aforementioned sense.

They contain on average at least one terminal and/or at least one pendant olefinically unsaturated group. That is, they contain at least one terminal or at least one pendant olefinically unsaturated group or they contain at least one terminal and at least one pendant olefinically unsaturated group. Of advantage in accordance with the invention is the use of pendant olefinically unsaturated groups. It is of particular advantage to use at least two, in particular more than two, olefinically unsaturated groups per molecule.

Examples of suitable olefinically unsaturated groups are (meth)acrylate, ethacrylate, crotonate, cinnamate, vinyl ether, vinyl ester, dicyclopentadienyl, norbornenyl, isoprenyl, isoprenyl, isopropenyl, allyl or butenyl groups; isoprenyl ether, isopropenyl ether, allyl ether or butenyl ether groups, or isoprenyl ester, isopropenyl ester, allyl ester or butenyl ester groups, of which (meth)acrylate or allyl ether groups, especially allyl ether groups, are of advantage and are therefore used with particular preference in accordance with the invention.

In addition to these olefinically unsaturated groups it is also possible to use ethenylarylene groups of the general formula (I):

$$CH_2=C(CH_3)-C_6H_4- \quad (I),$$

in which —$C_6H_4$— is a 1,2-, 1,3- or 1,4-phenylene radical, in particular a 1,3-phenylene radical.

The further essential constituent of the polyurethane (B) is on average at least one blocked isocyanate group. It is preferred to employ at least two blocked isocyanate groups. The blocked isocyanate groups result from the reaction of free isocyanate groups with suitable blocking agents. Examples of suitable blocking agents are those described below.

In relation to the polymer main chain of polyurethane (B), the blocked isocyanate groups are terminal and/or pendant. In the context of the process of the invention it is possible to employ polyurethanes (B) which contain terminal or pendant or terminal and pendant blocked isocyanate groups.

The polyurethanes (B) containing pendant blocked isocyanate groups are the polyurethanes of the invention.

Since in many cases the terminal blocked isocyanate groups can be obtained in a comparatively simple manner and fully meet the technical purpose according to the invention, they are used with preference in accordance with the invention.

The hydrophilic polyurethanes (B) further contain hydrophilic functional groups. Examples of suitable hydrophilic functional groups are those described below, among which carboxylic acid groups and/or carboxylate groups are of particular advantage and are therefore used with very particular preference in accordance with the invention.

The polyurethane (B) for use in accordance with the invention for preparing the graft copolymers is preferably obtainable by preparing, in a first process step, a polyurethane prepolymer (B1).

The polyurethane prepolymer (B1) is of linear, branched or comb construction, but especially linear construction. The linear polyurethane prepolymer (B1) contains on average preferably two free isocyanate groups, in particular two terminal free isocyanate groups. The branched or comb constructed polyurethane prepolymers (B1) contain preferably at least two, in particular more than two, free isocyanate groups, preference being given to terminal free isocyanate groups.

Where the polyurethane prepolymer (B1) is used for preparing the polyurethanes (B) of the invention, it contains on average at least one, in particular at least two, pendant blocked isocyanate groups.

Viewed in terms of method, the preparation of the polyurethane prepolymers (B1) for use in accordance with the invention has no special features but instead takes place, for example, as described in patents DE-C-197 22 862, DE-A-196 45 761, EP-A-0 522 419 or EP-A-0 522 420, by reaction of at least one polyol (B1.2), especially a diol (B1.2), with at least one polyisocyanate (B1.1), especially a diisocyanate (B1.1), the isocyanate component (B1.1) being employed in a molar excess, so that terminal free isocyanate groups result.

For the preparation of the polyurethane prepolymers (B1) it is preferred to use diisocyanates (B1.1) and also, if desired, in minor amounts, polyisocyanates (B1.1), for the purpose of introducing branches. In the context of the present invention, minor amounts are amounts which do not cause gelling of the polyurethane prepolymers (B1) during their preparation. This may also be prevented by using small amounts of monoisocyanates as well.

Examples of suitable diisocyanates (B1.1) are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptanemethylene diisocyanate or diisocyanates derived from dimeric fatty acids, as marketed under the commercial designation DDI 1410 by the company Henkel and described in patents DO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl)cyclohexane, liquid bis(4-isocyanatocyclohexyl)methane with a trans/trans content of up to 30% by weight, preferably 25% by weight, and in particular 20% by weight, as is described in patents DE-A-44 14 032, GB-A-1220717, DE-A-16 18 795 or DE-A-17 93 785; tolylene diisocyanate, xylylene diisocyanate, bisphenylene diisocyanate, naphthylene diisocyanate or diphenylmethane diisocyanate.

Examples of suitable polyisocyanates (B1.1) are the isocyanurates of the diisocyanates described above.

Examples of highly suitable monoisocyanates are phenyl isocyanate, cyclohexyl isocyanate, stearyl isocyanate or vinyl isocyanate, methacryloyl isocyanate and/or 1-(1-isocyanato-1-methylethyl)-3-(1-methylethenyl)benzene (TMI® from CYTEC), by means of which it is possible to introduce some of the olefinically unsaturated groups, especially ethenylarylene groups of the formula I, into the polyurethane prepolymers (B1).

Examples of suitable polyols (B1.2) are saturated or olefinically unsaturated polyester polyols which are prepared by reacting
  unsulfonated or sulfonated saturated and/or unsaturated polycarboxylic acids or their esterifiable derivatives, alone or together with monocarboxylic acids, and
  saturated and/or unsaturated polyols, alone or together with monools.

Examples of suitable polycarboxylic acids are aromatic, aliphatic and cycloaliphatic polycarboxylic acids. Preference is given to the use of aromatic and/or aliphatic polycarboxylic acids.

Examples of suitable aromatic polycarboxylic acids are phthalic acid, isophthalic acid, terephthalic acid, phthalic, isophthalic or terephthalic acid monosulfonate, or halophthalic acids, such as tetrachlorophthalic or tetrabromophthalic acid, among which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid or dodecanedicarboxylic acid, or maleic acid, fumaric acid or itaconic acid, of which adipic acid, glutaric acid, azelaic acid, sebacic acid, dimeric fatty acids and maleic acid are advantageous and are therefore used with preference.

Examples of suitable cycloaliphatic and cyclic unsaturated polycarboxylic acids are 1,2-cyclobutanedicarboxylic acid, 1,3-cyclobutane-dicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid or 4-methyltetrahydrophthalic acid. These dicarboxylic acids may be used both in their cis and in their trans form and also as a mixture of both forms.

Further examples of suitable polycarboxylic acids are polymeric fatty acids, especially those having a dimer content of more than 90% by weight, which are also known as dimer fatty acids.

Also suitable are the esterifiable derivatives of the abovementioned polycarboxylic acids, such as their monoesters or polyesters with aliphatic alcohols having 1 to 4 carbon atoms or hydroxy alcohols having 1 to 4 carbon atoms, for example. It is also possible to use the anhydrides of the abovementioned polycarboxylic acids, where they exist.

Together with the polycarboxylic acids it is also possible if desired to use monocarboxylic acids, such as, for example, benzoic acid, tert-butylbenzoic acid, lauric acid, isononanoic acid, or fatty acids of naturally occurring oils, and also acrylic acid, methacrylic acid, ethacrylic acid or crotonic acid, by means of which some of the olefinically unsaturated groups may be introduced into the polyurethane prepolymer (B1). A preferred monocarboxylic acid used is isononanoic acid.

Examples of suitable polyols are diols and triols, especially diols. Normally, triols are used alongside the diols in minor amounts in order to introduce branches into the polyester polyols (B1.2). In the context of the present invention, minor amounts are amounts which do not cause gelling of the polyester polyols (B1.2) during their preparation.

Suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol or the positionally isomeric diethyloctanediols. These diols may also be used per se for the preparation of the polyurethanes (A) for use in accordance with the invention.

Further examples of suitable diols are diols of the formula II or III:

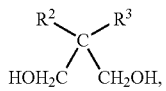
(II)

where $R^2$ and $R^3$ are each an identical or different radical and are an alkyl radical having 1 to 18 carbon atoms, an aryl radical or a cycloaliphatic radical, with the proviso that $R^2$ and/or $R^3$ must not be methyl;

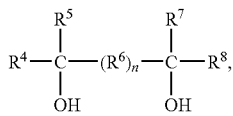
(III)

where $R^4$, $R^5$, $R^7$ and $R^8$ are each identical or different radicals and are an alkyl radical having 1 to 6 carbon atoms, a cycloalkyl radical or an aryl radical and $R^6$ is an alkanediyl radical having 1 to 6 carbon atoms, an arylene radical or an unsaturated alkenediyl radical having 1 to 6 carbon atoms, and n is either 0 or 1.

Suitable diols II of the general formula II are all propanediols in which either $R^2$ or $R^3$ or $R^2$ and $R^3$ is not methyl, such as, for example, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1]heptane, 2,2-diethyl-1,3-propanediol, 2,2-dipropyl-1,3-propanediol or 2-cyclohexyl-2-methyl-1,3-propanediol, et cetera.

Examples of diols III of the general formula III that may be used are 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-(2'-hydroxypropyl)benzene and 1,3-(2'-hydroxypropyl)benzene.

Of these diols, hexanediol and neopentyl glycol are particularly advantageous and are therefore used with particular preference.

The abovementioned diols may also be used as diols (B1.2) to prepare the polyurethane prepolymers (B1).

Examples of suitable triols are trimethylolethane, trimethylolpropane or glycerol, especially trimethylolpropane.

The abovementioned triols may also be used as triols (B1.2) to prepare the polyurethane prepolymers (B1) (cf. patent EP-A-0 339 433).

If desired, minor amounts of monools may also be used. Examples of suitable monools are alcohols or phenols such as ethanol, propanol, n-butanol, sec-butanol, tert-butanol, amyl alcohols, hexanols, fatty alcohols, phenol, or allyl alcohol, by means of which some of the olefinically unsaturated groups may be introduced into the polyurethane prepolymer (B1).

The polyester polyols (B1.2) may be prepared in the presence of small amounts of a suitable solvent as entrainer. Examples of entrainers used are aromatic hydrocarbons, such as especially xylene and (cyclo)aliphatic hydrocarbons, e.g., cyclohexane or methylcyclohexane.

Further examples of suitable polyols (B1.2) are polyester diols which are obtained by reacting a lactone with a diol. They are notable for the presence of terminal hydroxyl groups and repeating polyester fractions of the formula —(—CO—$(CHR^9)_m$—$CH_2$—O—)—. Here, the index m is preferably from 4 to 6 and the substituent $R^9$ is hydrogen or an alkyl, cycloalkyl, or alkoxy radical. No substituent contains more than 12 carbon atoms. The total number of carbon atoms in the substituent does not exceed 12 per lactone ring. Examples are hydroxycaproic acid, hydroxybutyric acid, hydroxydecanoic acid and/or hydroxystearic acid.

Preferred for the preparation of the polyester diols (B1.2) is the unsubstituted ###-caprolactone, where m is 4 and all substituents $R^9$ are hydrogen. The reaction with lactone is started by low molecular mass polyols such as ethylene glycol, 1,3-propanediol, 1,4-butanediol, or dimethylolcyclohexane. It is also possible, however, to react other reaction components, such as ethylenediamine, alkyldialkanolamines, or else urea, with caprolactone. Other suitable diols of relatively high molecular mass are polylactam diols, which are prepared by reacting, for example, ###-caprolactam with low molecular mass diols.

Further examples of suitable polyols (B1.2) include polyether polyols, especially those having a number-average molecular weight of from 400 to 5000, in particular from 400 to 3000. Examples of highly suitable polyether diols (B1.2) are polyether diols of the general formula H—(—O—$(CHR^1)_o$—$)_p$OH, where the substituent $R^{10}$ is hydrogen or a lower, unsubstituted or substituted alkyl radical, the index o is from 2 to 6, preferably from 3 to 4, and the index p is from 2 to 100, preferably from 5 to 50. Especially suitable examples are linear or branched polyether diols (B1.2) such as poly(oxyethylene) glycols, poly(oxypropylene) glycols, and poly(oxybutylene) glycols.

By means of the polyether diols (B1.2) it is possible to introduce the nonionic hydrophilic functional groups (b3), or some of them, into the main chain(s) of the polyurethane prepolymers (B1).

The substantially hydrophobic polyurethane prepolymers (B1) resulting from the reaction of the polyisocyanates (B1.1) and the polyols (B1.2), having at least two terminal free isocyanate groups, may be reacted with at least one of the blocking agents (B1.7) described below and with at least one compound containing an olefinically unsaturated group and an isocyanate-reactive functional group, examples including allyl alcohol or 2-hydroxyethyl acrylate, to give a hydrophobic self-crosslinking polyurethane (B) containing on average per molecule one terminal olefinically unsaturated group and one terminal blocked isocyanate group. This polyurethane (B) may be used in the context of the process of the invention.

In accordance with the invention, however, it is of advantage to use further building blocks additionally for preparing the polyurethane prepolymers (B1) and the polyurethanes (B).

Where the polyurethane prepolymers (B1) are used for preparing graft copolymers and polyurethanes (B) of the invention, they are prepared using, in accordance with the invention, for the purpose of introducing the pendant blocked isocyanate groups, at least one further compound (B1.3) which contains at least one, especially one, blocked isocyanate group and at least two, especially two, isocyanate-reactive functional groups. Examples of suitable isocyanate-reactive groups are —SH, —$NH_2$, >NH, —OH, —O—(CO)—NH—(CO)—$NH_2$ or —O—(CO)—$NH_2$, of which the primary and secondary amino groups and the hydroxyl group are of advantage and the hydroxyl groups are of particular advantage.

These compounds (B1.3) are preferably prepared by reacting, in a first process step, at least one above-described polyisocyanate (B1.1), in particular a diisocyanate (B1.1), with at least one monofunctional blocking agent (B1.7), in a molar ratio such that there remains on average at least one, especially one, free isocyanate group in the resultant intermediate.

Examples of suitable blocking agents (B1.7) are the blocking agents known from the U.S. Pat. No. 4,444,954:

i) phenols such as phenol, cresol, xylenol, nitrophenol, chlorophenol, ethylphenyl, t-butylphenol, hydroxybenzoic acid, esters of this acid or 2,5-di-tert-butyl-4-hydroxytoluene;
ii) lactams, such as ε-caprolactam, δ-valerolactam, γ-butyrolactam or β-propiolactam;
iii) active methylenic compounds, such as diethyl malonate, dimethyl malonate, ethyl or methyl acetoacetate or acetylacetone;
iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;
v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;
vi) acid amides such as acetoanilide, acetoanisidinamide, acrylamide, methacrylamide, acetamide, stearamide or benzamide;
vii) imides such as succinimide, phthalimide or maleimide;
viii) amines such as diphenylamine, phenylnaphthylamine, xylidine, N-phenylxylidine, carbazole, aniline, naphthylamine, butylamine, dibutylamine or butylphenylamine;
ix) imidazoles such as imidazole or 2-ethylimidazole;
x) ureas such as urea, thiourea, ethyleneurea, ethylenethiourea or 1,3-diphenylurea;
xi) carbamates such as phenyl N-phenylcarbamate or 2-oxazolidone;
xii) imines such as ethyleneimine;
xiii) oximes or ketoximes such as acetone oxime, formaldoxime, acetaldoxime, acetoxime, methyl ethyl ketoxime, diisobutyl ketoxime, diacetyl monoxime, benzophenone oxime or chlorohexanone oximes;
xiv) salts of sulfurous acid such as sodium bisulfite or potassium bisulfite;
xv) hydroxamic esters such as benzyl methacrylohydroxamate (BMH) or allyl methacrylohydroxamate; or
xvi) substituted pyrazoles, especially dimethylpyrazole, imidazoles or triazoles; and also
xvii) mixtures of these blocking agents, such as dimethylpyrazole and triazoles, malonates and acetoacetates or dimethylpyrazole and succinimide.

Of these blocking agents (B1.7), the oximes and ketoximes xiii), especially the ketoximes xiii), more particularly methyl ethyl ketoxime, and also the substituted pyrazole xvi), especially dimethylpyrazole, offer particular advantages and are therefore used with particular preference.

In a second process step, the intermediate is then reacted with at least one compound containing at least three, in particular three, isocyanate-reactive functional groups per molecule. The molar ratio of intermediate to trifunctional compound is chosen here so that preferably two isocyanate-reactive functional groups remain in the resultant compound (B1.3).

Examples of suitable compounds containing at least three isocyanate-reactive functional groups are the above-described triols (B1.2) or the polyamines or amino alcohols (B1.8) described below. Also suitable are polyols of higher functionality such as pentaerythritol or homopentaerythritol or sugar alcohols such as threitol or erythritol or pentitols such as arabitol, adonitol or xylitol or hexitols such as sorbitol, mannitol or dulcitol.

The method of preparing the compounds (B1.3) has no special features but instead takes place by the reaction of the above-described starting products in an inert organic medium, preferably in polar organic solvents such as ketones, especially methyl ethyl ketone, or amides, especially N-methylpyrrolidone, which have no functional groups which react with isocyanate groups. It is essential that the reaction take place until free isocyanate groups are no longer detectable in the reaction mixture.

The compounds (B1.3) also result in an increase in the molecular weight of the polyurethane prepolymers (B1).

For preparing the polyurethane prepolymers (B1) which are used to prepare the inventively preferred polyurethanes (B), use is further made of at least one compound (B1.4) containing at least one olefinically unsaturated group and at least two isocyanate-reactive functional groups.

Examples of suitable isocyanate-reactive functional groups are those described above. Examples of suitable olefinically unsaturated groups are likewise described above.

In one preferred variant, the compound (B1.4) is prepared from one of the above-described difunctional or trifunctional polyisocyanates (B1.1) and a compound containing at least one isocyanate-reactive functional group and at least one olefinically unsaturated group. Examples of suitable compounds of this kind are the monomers (a1) described below. The compounds are reacted with the polyisocyanates (B1.1) in a molar ratio such that the intermediate still contains at least one, especially one, free isocyanate group. In a further process step the intermediate is reacted with a compound containing at least three isocyanate-reactive functional groups, in a molar ratio such that at least two, especially two, isocyanate-reactive functional groups remain in the resultant compounds (B1.4).

Examples of suitable compounds containing at least three isocyanate-reactive functional groups in the molecule are those described above in connection with the preparation of the compound (B1.3). As far as the preparation of the compounds (B1.4) is concerned, the comments made in connection with the compounds (B1.3) apply analogously.

Further examples of preferred compounds (B1.4) are
the monoesters of the olefinically unsaturated monomers (a2) described below, containing at least one acid group per molecule, with the above-described triols (B1.2),
the monoethers of the unsaturated alcohols (a1) described below with the triols (B1.2) described above,
the monoesters or diesters of the olefinically unsaturated monomers (a2) described below and containing at least one acid group per molecule with the above-described tetrols,
the monoethers or diethers of the unsaturated alcohols (a1) described below with the above-described tetrols,
the monoesters, diesters or triesters of the olefinically unsaturated monomers (a2) described below and containing at least one acid group per molecule with the above-described pentitols,
the monoethers, diethers or triethers of the unsaturated alcohols (a1) described below with the above-described pentitols, the monoesters, diesters, triesters or tetraesters of the olefinically unsaturated monomers (a2) described below and containing at least one acid group per molecule with the above-described hexitols, the monoethers, diethers, triethers or tetraethers of the unsaturated alcohols (a1) described below with the above-described hexitols, or the reaction products of the olefinically unsaturated monomers (a2) described below and containing at least one acid group per molecule with diepoxides such as bisphenol A diglycidyl ether Further examples of preferred compounds (B1.4) are known from patents DE-C-197 22 862, DE-A-196 45 761, EP-A-0 522 419 or EP-A-0 522 420.

Of these, trimethylolpropane monoallyl ether is used with very particular preference as compound (B1.4). Additionally to these compounds (B1.4) it is also possible to use the reaction products of 1-(1-isocyanato-1-methylethyl)-3-(1-methylethenyl)benzene (TMI® from CYTEC) with the above-described compounds containing at least three isocyanate-reactive functional groups. Here as well, the reaction is carried out in a molar ratio such that the resultant reaction product still contains at least two isocyanate-reactive functional groups in the molecule.

For the preparation of the hydrophilic polyurethanes (B), further, compounds (B1.5) having at least one hydrophilic functional group and at least two isocyanate-reactive functional groups are incorporated into the polyurethane prepolymers (B1).

The resultant hydrophilic polyurethane prepolymers (B1) comprise alternatively (b1) hydrophilic functional groups convertible into cations by neutralizing agents and/or quaternizing agents, and/or cationic groups, especially ammonium groups, or (2) functional groups convertible into anions by neutralizing agents, and/or anionic groups, especially carboxylic acid and/or carboxylate groups, and/or (b3) nonionic hydrophilic groups, especially poly(alkylene ether) groups.

Examples of suitable functional groups (b1) for use in accordance with the invention and convertible into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups (b1) for use in accordance with the invention are primary, secondary, tertiary or quaternary ammonium groups, tertiary sulfonium groups or quaternary phosphonium groups, preferably quaternary ammonium groups or tertiary sulfonium groups, but especially tertiary sulfonium groups.

Examples of suitable functional groups (b2) for use in accordance with the invention and convertible into anions by neutralizing agents are carboxylic acid, sulfonic acid or phosphonic acid groups, especially carboxylic acid groups.

Examples of suitable anionic groups (b2) for use in accordance with the invention are carboxylate, sulfonate or phosphonate groups, especially carboxylate groups.

Examples of suitable neutralizing agents for functional groups (b1) convertible into cations are organic and inorganic acids such as formic acid, acetic acid, lactic acid, dimethylolpropionic acid, citric acid, sulfuric acid, hydrochloric acid or phosphoric acid.

Examples of suitable neutralizing agents for functional groups (b2) convertible into anions are ammonia or amines, such as trimethylamine, triethylamine, tributylamine, dimethylaniline, diethylaniline, triphenylamine, dimethylethanolamine, diethylethanolamine, methyldiethanolamine, 2-amino-methylpropanol, dimethylisopropylamine, dimethylisopropanolamine or triethanolamine, for example. Neutralization may take place in organic phase or in aqueous phase. A preferred neutralizing agent used is dimethylethanolamine and/or triethylamine.

The introduction of hydrophilic functional (potentially) cationic groups (b1) into the polyurethane prepolymers (B1) takes place by way of the incorporation of compounds which contain in the molecule at least one, especially two, isocyanate-reactive groups and at least one group capable of forming cations; the amount to be used may be calculated from the target amine number.

Suitable isocyanate-reactive groups are those described above, in particular hydroxyl groups and also primary and/or secondary amino groups, of which the hydroxyl groups are preferably used.

Examples of suitable compounds of this kind are 2,2-dimethylolethyl- or -propylamine blocked with a ketone, the resultant ketoxime group being hydrolyzed again prior to the formation of the cationic group (b1), or N,N-dimethyl-, N,N-diethyl- or N-methyl-N-ethyl-2,2-dimethylolethyl- or -propylamine.

The introduction of hydrophilic functional (potentially) anionic groups (b2) into the polyurethane prepolymers (B1) takes place by way of the incorporation of compounds which contain in the molecule at least one isocyanate-reactive group and at least one group capable of forming anions; the amount to be used may be calculated from the target acid number.

Examples of suitable compounds of this kind are those containing two isocyanate-reactive groups in the molecule. Suitable isocyanate-reactive groups are in particular hydroxyl groups, and primary and/or secondary amino groups. Accordingly it is possible, for example, to use alkanoic acids having two substituents on the α carbon atom. The substituent may be a hydroxyl group, an alkyl group, or, preferably, an alkylol group. These alkanoic acids have at least one, generally from 1 to 3 carboxyl groups in the molecule. They have 2 to about preferably 3 to 10, carbon atoms. Examples of suitable alkanoic acids are dihydroxypropionic acid, dihydroxysuccinic acid, and dihydroxybenzoic acid. A particularly preferred group of alkanoic acids are the α,α-dimethylolalkanoic acids of the general formula $R^{11}$—C(CH$_2$OH)$_2$COOH, $R^{11}$ being a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid, and 2,2-dimenthylolpentanoic acid. The preferred dihydroxyalkanoic acid is 2,2-dimethylolpropionic acid. Examples of compounds containing amino groups are α,δ-diaminovaleric acid, 3,4-diaminobenzoic acid, 2,4-diaminotoluenesulfonic acid, and 2,4-diaminodiphenyl ether sulfonic acid.

Hydrophilic functional nonionic poly(oxyalkylene) groups (b3) may be introduced as lateral or terminal groups into the polyurethane molecules. For this purpose it is possible to use not only the above-described polyether diols but also, for example, alkoxypoly(oxyalkylene) alcohols having the general formula $R^{12}O$—(—CH$_2$—CHR$^{13}$—O—)$_r$H, where $R^{12}$ is an alkyl radical having 1 to 6 carbon atoms, $R^{13}$ is a hydrogen atom or an alkyl radical having 1 to 6 carbon atoms, and the index r is a number between 20 and 75 (cf. patents EP-A-0 354 261 or EP-A-0 424 705).

The hydrophilic functional groups (b1) or (b2) are to be selected so as to rule out the possibility of any disruptive reactions, such as, for instance, salt formation or crosslinking with the functional groups that may be present in the other constituents of the polyurethane (B), of the graft copolymers, of the coating material, of the sealing compound, or of the adhesive. The skilled worker will therefore be able to make the selection in a simple manner on the basis of his or her knowledge in the art.

Of these hydrophilic functional (potentially) ionic groups (b1) and (b2) and the hydrophilic functional nonionic groups (b3), the (potentially) anionic groups (b2) are advantageous and are therefore used with particular preference.

The preparation of the above-described polyurethane prepolymers (B1) from the above-described starting compounds (B1.1) to (B1.5) likewise has no special features in terms of its method but instead takes place without solvent or in an inert organic medium, preferably in an inert organic medium, in which case it is possible with preference to employ the polar organic solvents described above. The reaction here may take place in two or more stages or in one stage. It is essential that the reaction is carried out until the free isocyanate content is constant.

The terminal free isocyanate groups of the resulting hydrophilic or hydrophobic polyurethane prepolymers (B1) are reacted with at least one of the above-described blocking agents (B1.7), so giving the self-crosslinking hydrophilic or hydrophobic polyurethane (B) containing terminal blocked isocyanate groups.

Where the hydrophilic or hydrophobic polyurethane prepolymer (B1) already contains terminal blocked isocyanate groups, its terminal free isocyanate groups may likewise be reacted with the blocking agent (B1.7), so giving the polyurethane (B) of the invention containing terminal and pendant blocked isocyanate groups.

Alternatively, in the case of the hydrophilic or hydrophobic polyurethane prepolymers (B1) containing pendant blocked isocyanate groups, the terminal free isocyanate groups may be reacted with at least one compound (B1.8) to give an increase in the molecular weight of the polyurethanes (B) of the invention.

Examples of suitable compounds (B1.8) are the above-described low molecular weight polyols (B1.2), tetrols, pentitols or hexitols.

Further examples of suitable compounds (B1.8) are polyamines or amino alcohols.

Examples of suitable polyamines (B1.8) have at least two primary and/or secondary amino groups. Polyamines (B1.8) are essentially alkylene polyamines having 1 to 40 carbon atoms, preferably about 2 to 15 carbon atoms. They may carry substituents which have no hydrogen atoms that are reactive with isocyanate groups. Examples are polyamines (B1.8) having a linear or branched aliphatic, cycloaliphatic or aromatic structure and at least two primary amino groups.

Diamines (B1.8) include hydrazine, ethylenediamine, propylenediamine, 1,4-butylenediamine, piperazine, 1,4-cyclohexyldimethylamine, 1,6-hexamethylenediamine, trimethylhexamethylenediamine, methanediamine, isophoronediamine, 4,4'-diaminodicyclohexylmethane, and aminoethylenothanolamine. Preferred diamines (B1.8) are hydrazine, alkyl- or cycloalkyldiamines such as propylenediamine and 1-amino-3-aminomethyl-3,5,5-trimethylcyclohexane.

It is also possible to use polyamines (B1.8) containing more than two amino groups in the molecule. In these cases, however, it should be ensured—for example, by using monoamines as well—that no crosslinked polyurethane resins are obtained. Polyamines (B1.8) of this kind which may be used are diethylenetriamine, triethylenetetramine, dipropylenediamine, and dibutylene-triamine. An example of a monoamine that may be mentioned is ethylhexylamine (cf. patent EP-A-0 089 497). The polyamines may also be used with advantage for preparing the compounds (B1.1).

Examples of suitable amino alcohols (B1.8) are ethanolamine or diethanolamine. The amino alcohols may also be used with advantage for preparing the compounds (B1.3) or (B1.4).

The reaction of the polyurethane prepolymers (B1) with the compounds (B1.8) or the blocking agents (B1.7) likewise has no special features in terms of its method but instead takes place without solvent or in an inert organic medium, preferably in an inert organic medium, in which context the polar organic solvents described above are employed with preference. It is essential that the reaction takes place until free isocyanate groups can no longer be detected in the reaction mixture.

The olefinically-unsaturated-group content of the polyurethanes (B) including those of the invention, may vary very widely. It is preferably from 0.01 to 30%, more preferably from 0.1 to 25%, with particular preference from 0.2 to 20%, with very particular preference from 0.25 to 15%, and in particular from 0.3 to 10% by weight, based in each case on the polyurethane (B).

The blocked-isocyanate-group content of the polyurethanes (B) including those of the invention, may also vary very widely. It is preferably from 0.01 to 30%, more preferably from 0.1 to 25%, with particular preference from 0.2 to 20%, with very particular preference from 0.25 to 15%, and in particular from 0.3 to 10% by weight, based in each case on the polyurethane (B).

Particularly advantageous hydrophilic or hydrophobic polyurethanes (B) of the invention here contain on average per molecule at least one, preferably 1 to 2 and in particular 1 to 3 pendant, at least one pendant and at least one terminal, preferably 1 to 2 pendant and 1 to 2 terminal, blocked isocyanate groups.

Particularly advantageous hydrophilic or hydrophobic polyurethanes (B), including those of the invention, here contain on average per molecule at least one, preferably 1 to 2 and in particular 1 to 3 pendant, at least one, preferably 1 to 2 and in particular 1 to 3 terminal, or at least one pendant and at least one terminal, preferably 1 to 2 pendant and 1 to 2 terminal, olefinically unsaturated groups.

In the context of the process of the invention, the polyurethanes (B), including those of the invention, are dispersed in an aqueous medium. For the purpose of dispersing, the hydrophilic polyurethanes (B) which contain the above-described (potentially) ionic hydrophilic functional groups (b1) or (b2) are neutralized with at least one of the neutralizing agents described above, and thereafter dispersed. In the case of the hydrophilic polyurethanes (B) which contain only the nonionic hydrophilic functional groups (b3), the use of neutralizing agents is unnecessary.

The aqueous medium itself contains essentially water. The aqueous medium here may include minor amounts of organic solvents, neutralizing agents, crosslinking agents and/or customary coatings additives and/or other dissolved solid, liquid or gaseous, organic and/or inorganic, low and/or high molecular mass substances. In the context of the present invention, the term "minor amount" refers to an amount which does not destroy the aqueous nature of the aqueous medium. The aqueous medium may alternatively comprise straight water.

The resultant polyurethane dispersions (B), including the polyurethane dispersions (B) of the invention, are used for the preparation of the graft copolymers, including the graft copolymers of the invention, which form the essential constituent of the aqueous basecoat materials.

The graft copolymers, including those of the invention, are preparable, according to a first advantageous variant, by dispersing at least one hydrophilic polyurethane (B) in an aqueous medium, after which a mixture of at least one monomer (a1) containing at least one isocyanate-reactive functional group and at least one monomer (a2) copolymerizable therewith is free-radically (co)polymerized in emulsion in its presence.

According to a second advantageous variant, the graft copolymers, including those of the invention, are preparable by dispersing at least one hydrophobic polyurethane (B) in an aqueous medium. Advantageously, this is carried out within a strong shear field. Viewed in terms of its method, this process has no special features but can instead take place, for example, in accordance with the dispersion processes described in European patent application EP-A-0 401 565. Accordingly, a mixture of at least one monomer (a1) containing at least one isocyanate-reactive functional group and at least one monomer (a2) copolymerizable therewith is free-radically (co)polymerized in emulsion in the presence of the dispersed polyurethane (B). In accordance with the invention it is of advantage for this variant if the monomer (a2) contains at least one of the above-described hydrophilic functional groups. As regards the selection of the hydrophilic functional groups, the comments made above apply.

As isocyanate-reactive functional groups it is preferred to use those described above.

Examples of monomers (a1) suitable for preparing the graft copolymers, including those of the invention, are the following:

hydroxyalkyl esters of acrylic acid, methacrylic acid or another alpha,beta-ethylenically unsaturated carboxylic acid which are derived from an alkylene glycol which is esterified with the acid, or are obtainable by reacting the acid with an alkylene oxide, especially hydroxyalkyl esters of acrylic acid, methacrylic acid or ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate or crotonate; 1,4-bis (hydroxy-methyl)cyclohexane, octahydro-4,7-methano-1H-indenedimethanol or methylpropanediol monoacrylate, monomethacrylate, monoethacrylate or monocrotonate; or reaction products of cyclic esters, such as epsilon-caprolactone, for example, and these hydroxyalkyl esters;

olefinically unsaturated alcohols such as allyl alcohol, 4-hydroxybutyl vinyl ether or polyols such as trimethylolpropane monoallyl or diallyl or divinyl ether or pentaerythritol monoallyl, diallyl or triallyl or divinyl or trivinyl ether;

reaction product of acrylic acid and/or methacrylic acid with the glycidyl ester of an alpha-branched monocarboxylic acid having 5 to 18 carbon atoms per molecule. The reaction of the acrylic or methacrylic acid with the glycidyl ester of a carboxylic acid having a tertiary alpha carbon atom may take place before, during or after the polymerization reaction. As component (a5) it is preferred to use the reaction product of acrylic and/or methacrylic acid with the glycidyl ester of Versatic® acid. This glycidyl ester is obtainable commercially under the name Cardura® E10. For further details, reference is made to Römpp Lexikon Lacke und Druckfarben, Georg Thieme Verlag, Stuttgart, New York, 1998, pages 605 and 606;

(meth)acrylamides such as (meth)acrylamide, N-methyl-, N-ethyl-, N-propyl-, N-butyl-, N-cyclohexyl-, N-methylol-, N,N-dimethylol-, N-methoxymethyl- and/or N-methoxybutyl(meth)acrylamide; these monomers may also be used as monomers (a2) containing hydrophilic functional groups. To this end they are neutralized with the above-described neutralizing agents or reacted with quaternizing agents.

These monomers (a1) of higher functionality are generally used only in minor amounts. In the context of the present invention, minor amounts of higher-functional monomers (a1) here are amounts which do not result in the crosslinking or gelling of the grafted-on (meth)acrylate copolymers (A). Thus, the proportion of trimethylolpropane monoallyl ether may be from 2 to 10% by weight, based on the overall weight of the monomers (a1) and (a2) used to prepare the polyacrylate resin.

Examples of monomers (a2) suitable for preparing the graft copolymers, including those of the invention, are the following:

(Meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acrylate; (meth)acrylic oxaalkyl esters or oxacycloalkyl esters such as ethyltriglycol (meth)acrylate and methoxyoligoglycol (meth)acrylate having a molecular weight Mn of preferably 550; or other ethoxylated and/or propoxylated hydroxyl-free (meth)acrylic acid derivatives. These may include, in minor amounts, higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylolpropane di- or tri (meth)acrylate; or pentaerythritol di-, tri- or tetra(meth) acrylate. In the context of the present invention, minor amounts of higher-functional monomers (a2) here are amounts which do not cause crosslinking or gelling of the grafted-on (meth)acrylate copolymers (A).

Ethylenically unsaturated monomers which carry at least one acid group, preferably a carboxyl group, per molecule, or a mixture of such monomers. It is particularly preferred to use acrylic acid and/or methacrylic acid. It is also possible, however, to use other ethylenically unsaturated carboxylic acids having up to 6 carbon atoms in the molecule. Examples of such acids are ethacrylic acid, crotonic acid, maleic acid, fumaric acid, and itaconic acid. It is also possible to use ethylenically unsaturated sulfonic or phosphonic acids or their partial esters. Further suitable monomers include mono(meth) acryloyloxyethyl maleate, succinate, and phthalate.

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products from paraffinic hydrocarbons, such as mineral oil fractions, and may contain both branched and straight-chain acyclic and/or cycloaliphatic olefins. In the reaction of such olefins with formic acid and/or with carbon monoxide and water, a mixture of carboxylic acids is formed in which the carboxyl groups are located predominantly on a quaternary carbon atom. Other olefinic starting materials are, for example, propylene trimer, propylene tetramer, and diisobutylene. Alternatively, the vinyl esters may be prepared in a conventional manner from the acids, for example, by reacting the acid with acetylene. Particular preference—owing to their ready availability—is given to the use of vinyl esters of saturated aliphatic monocarboxylic acids having 9 to 11 carbon atoms and being branched on the alpha carbon atom.

Olefins such as ethylene, propylene, 1-butene, 1-pentene, 1-hexene, cyclohexene, cyclopentene, norbornene, butadiene, isoprene, cyclopentadiene and/or dicyclopentadiene;

monomers containing epoxide groups, such as the glycidyl esters of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methylstyrene, arylstyrenes, in particular diphenyl-ethylene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are marketed under the brand name VeoVa® by the company Deutsche Shell Chemie (for further details, refer to Römpp Lexikon Lacke und Druckfarben, Georg Thieme Verlag, Stuttgart, New York, 1998, page 598 and also pages 605 and 606), and/or the vinyl ester of 2-methyl-2-ethylheptanoic acid.

Polysiloxane macromonomers having a number-average molecular weight Mn of from 1000 to 40,000, preferably from 2000 to 20,000, with particular preference from 2500 to 10,000, and in particular from 3000 to 7000, and having on average from 0.5 to 2.5, preferably from 0.5 to 1.5, ethylenically unsaturated double bonds per molecule, as are described in DE-A-38 07 571 on pages 5 to 7, in DE-A-37 06 095 in columns 3 to 7, in EP-B-0 358 153 on pages 3 to 6, in U.S. Pat. No. 4,754,014 in columns 5 to 9, in DE-A-44 21 823 or in international patent application WO 92/22615 on page 12 line 18 to page 18 line 10, or acryloyloxysilane-containing vinyl monomers, preparable by reacting hydroxy-functional silanes with epichlorohydrin and then reacting the reaction product with methacrylic acid and/or hydroxyalkyl esters of (meth)acrylic acid.

From these suitable monomers (a1) and (a2) described above by way of example, the skilled worker is easily able to select, on the basis of their known physicochemical properties and reactivities, the hydrophilic or hydrophobic monomers (a1) and (a2) that are particularly suitable for the intended use in question. If desired, he or she may for this purpose conduct a few preliminary rangefinding experiments.

In particular, he or she will be careful to ensure that the monomers (a1) and (a2) contain no functional groups, especially (potentially) ionic functional groups, which enter into unwanted interactions with other (potentially) ionic functional groups present, for example, in the hydrophilic polyurethanes (B).

In accordance with the invention, the monomers (a1) and (a2) are selected such that the profile of properties of the grafted-on (meth)acrylate (co)polymers (A) is determined essentially by the above-described hydrophilic or hydrophobic (meth)acrylate monomers (a1) and (a2), the other monomers (a1) and (a2) advantageously providing broad variation of this profile of properties.

Viewed in terms of method, the preparation of the graft copolymers, including those of the invention, has no special features but instead takes place in accordance with the customary and known methods of free-radical emulsion polymerization in the presence of at least one polymerization initiator, such as is described, for example, in patents DE-C-197 22 862, DE-A-196 45 761, EP-A-0 522 419 or EP-A-0 522 420.

The monomers (a1) and (a2) here may also be brought, with the aid of a portion of a polyurethane dispersion (B) and water, into the form of a preemulsion, which is then slowly metered into an initial charge in which the actual emulsion polymerization proceeds.

Examples of suitable polymerization initiators are initiators which form free radicals, such as dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate, or tert-butyl per-2-ethylhexanoate; potassium, sodium or ammonium peroxodisulfate; azo dinitriles such as azobisisobutyronitrile; C—C-cleaving initiators such as benzpinacol silyl ethers; or a combination of a nonoxidizing initiator with hydrogen peroxide. Water-insoluble initiators are preferably used. The initiators are used preferably in an amount of from 0.1 to 25% by weight, with particular preference from 0.75 to 10% by weight, based on the overall weight of the monomers (a1) and (a2).

In the aqueous emulsions the monomers (a1) and (a2) are then polymerized with the aid of the abovementioned free-radical initiators at temperatures from 0 to 95° C., preferably 40 to 95° C., and, when using redox systems, at temperatures from 30 to 70° C. When operating under superatmospheric pressure the polymerization may also be conducted at temperatures above 100° C.

It is preferred to commence the addition of initiator some time, generally from about 1 to 15 minutes, before the addition of the monomers (a1) and (a2). Preference is further given to a process in which the addition of initiator is commenced at the same point in time as the addition of the monomers (a1) and (a2) and is ended about half an hour after the addition of the monomers (a1) and (a2) has been ended. The initiator is preferably added in a constant amount per unit time. After the end of the addition of initiator, the reaction mixture is held at polymerization temperature until (generally 1.5 hours) all of the monomers (a1) and (a2) used have undergone substantially complete reaction. "Substantially complete reaction" is intended to denote that preferably 100% by weight of the monomers (a1) and (a2) used have undergone reaction but that it is also possible for a small residual monomer content of not more than up to about 0.5% by weight, based on the weight of the reaction mixture, to remain unreacted.

Suitable reactors for the graft copolymerization include the customary and known stirred tanks, stirred tank cascades, tube reactors, loop reactors or Taylor reactors, as are described, for example, in patents DE-B-1 071 241 or EP-A-0 498 583 or in the article by K. Kataoka in Chemical Engineering Science, Volume 50, No. 9, 1995, pages 1409 to 1416.

The quantitative ratio of core to shell in the graft copolymers may vary extremely widely, which is a particular advantage of the graft copolymers, especially those of the invention. Preferably this ratio is from 1:100 to 100:1, more preferably from 1:50 to 50:1, with particular preference from 30:1 to 1:30, with very particular preference from 20:1 to 1:20, and in particular from 10:1 to 1:10. Very particular advantages result if this ratio is approximately 3.5:1 to 1:3.5, in particular 1.5:1 to 1:1.5.

In the case of the inventively preferred use of (potentially) anionic hydrophilic functional groups (b2), especially carboxylic acid groups, further particular advantages result if in the graft copolymers of the invention the ratio of acid number of the shell to acid number of the core is >1, preferably >3, more preferably >5, with particular preference >7, with very particular preference >9, and in particular >10.

In the aqueous basecoat materials, the graft copolymers, including those of the invention, are present advantageously in an amount of from 1.0 to 50%, preferably from 2.0 to 40%, with particular preference from 3.0 to 35%, with very particular preference from 4.0 to 30%, and in particular from 5.0 to 25% by weight, based in each case on the overall weight of the respective aqueous basecoat material.

The further essential constituent of the aqueous basecoat material is at least one color and/or effect pigment. The pigments may consist of organic or inorganic compounds. On the basis of this large number of suitable pigments, therefore, the aqueous basecoat material of the invention ensures a universal scope for use and permits the realization of a large number of color shades and optical effects.

Effect pigments which can be used include metal flake pigments such as commercial aluminum bronzes, the chromated aluminum bronzes of DE-A-36 36 183, commercial stainless steel bronzes, and nonmetallic effect pigments, such as pearlescent pigments and interference pigments, for example. For further details refer to Römpp Lexikon Lacke und Druckfarben, Georg Thieme Verlag, 1998, page 176, "Effect pigments" and pages 380 and 381 "Metal oxide-mica pigments" to "Metal pigments".

Examples of suitable inorganic color pigments are titanium dioxide, iron oxides, Sicotrans yellow, and carbon black. Examples of suitable organic color pigments are thioindigo pigments indanthrene blue, Cromophthal red, Irgazine orange and Heliogene green. For further details refer to Römpp Lexikon Lacke und Druckfarben, Georg Thieme Verlag, 1998, pages 180 and 181, "Iron blue pigments" to "Black iron oxide", pages 451 to 453 "Pigments" to "Pigment volume concentration", page 563 "Thioindigo pigments" and page 567 "Titanium dioxide pigments".

The fraction of the pigments in the aqueous basecoat material may vary extremely widely and is guided in particular by the opacity of the pigments, the desired shade, and the desired optical effect. In the aqueous basecoat material the pigments are present in an amount of preferably from 0.5 to 50%, more preferably from 0.5 to 45%, with particular preference from 0.5 to 40%, with very particular preference from 0.5 to 35%, and in particular from 0.5 to 30% by weight, based in each case on the overall weight of the aqueous basecoat material. The pigment/binder ratio, i.e., the ratio of the pigments to the polyurethanes (B) of the invention and/or to the graft copolymers of the invention, and also any other binders that may be present, may vary extremely widely. This ratio is preferably from 6.0:1.0 to 1.0:50, more preferably from 5:1.0 to 1.0:50, with particular preference from 4.5:1.0 to 1.0:40, with very particular preference from 4:1.0 to 1.0:30, and in particular from 3.5:1.0 to 1.0:25.

These pigments may also be incorporated into the aqueous basecoat materials of the invention by way of pigment pastes, in which case suitable grinding resins include the polyurethanes (B) and/or their graft copolymers.

The aqueous basecoat material may if desired further comprise at least one crosslinking agent.

Examples of suitable crosslinking agents are amino resins, compounds or resins containing anhydride groups, compounds or resins containing epoxide groups, tris(alkoxycarbonylamino)triazines, compounds or resins containing carbonate groups, blocked and/or nonblocked polyisocyanates, beta-hydroxyalkylamides, and compounds containing on average at least two transesterifiable groups, examples being reaction products of malonic diesters and polyisocyanates or of esters and partial esters of polyhydric alcohols of malonic acid with monoisocyanates, such as are described by European patent EP-A-0 596 460.

Crosslinking agents of this kind are well known to the skilled worker and are offered by numerous companies as sales products.

Where used in the aqueous basecoat materials of the invention the crosslinking agents are employed in an amount of from 0.1 to 30%, more preferably from 0.3 to 20%, with particular preference from 0.5 to 10%, and in particular from 1.0 to 8.0% by weight, based in each case on the overall weight of the respective aqueous basecoat material.

In addition to the constituents described above, the aqueous basecoat material may comprise customary and known binders and/or additives in effective amounts.

Examples of customary and known binders are oligomeric and polymeric, thermally curable, linear and/or branched and/or block, comb and/or random poly(meth)acrylates or acrylic copolymers, especially those described in patent DE-A-197 36 535, polyesters, especially those described in patent DE-A-40 09 858 or DE-A-44 37 535, alkyds, acrylated polyesters, polylactones, polycarbonates, polyethers, epoxy resin-amine adducts, (meth)acrylate diols, partially hydrolyzed polyvinyl esters, polyurethanes and acrylated polyurethanes, such as those described in patents EP-A-0 521 928, EP-A-0 522 420, EP-A-0 522 419, EP-A-0 730 613 or DE-A-44 37 535, or polyureas;

Examples of suitable additives are organic and inorganic fillers such as chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers or wood flour; for further details refer to Römpp Lexikon Lacke und Druckfarben, Georg Thieme Verlag, 1998, pages 250 ff., "Fillers";

thermally curable reactive diluents such as positionally isomeric diethyloctanediols or hydroxyl-containing hyperbranched compounds or dendrimers;

low-boiling and/or high-boiling organic solvents ("long solvents");

UV absorbers;

light stabilizers such as HALS compounds, benzotriazoles or oxalanilides;

free-radical scavengers;

thermally labile free-radical initiators such as organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles or benzpinacol silyl ethers;

crosslinking catalysts such as dibutyltin dilaurate, lithium decanoate or zinc octoate, or amine-blocked organic sulfonic acids;

devolatilizers such as diazadicycloundecane;

slip additives;

polymerization inhibitors;

defoamers;

emulsifiers, especially nonionic emulsifiers such as alkoxylated alkanols, polyols, phenols and alkylphenols or anionic emulsifiers such as alkali metal salts or ammonium salts of alkanecarboxylic acids, alkanesulfonic acids and sulfo acids of alkoxylated alkanols, polyols, phenols and alkylphenols;

wetting agents such as siloxanes, fluoric compounds, carboxylic monoesters, phosphates, polyacrylic acids and their copolymers, or polyurethanes;

adhesion promoters such as tricyclodecanedimethanol;

leveling agents;

film-forming auxiliaries such as cellulose derivatives;

transparent fillers based on titanium dioxide, silica, alumina or zirconium oxide; for further details refer to Römpp Lexikon Lacke und Druckfarben, Georg Thieme Verlag, Stuttgart, 1998, pages 250 to 252;

rheology control additives, such as those known from patents WO 94/22968, EP-A-0 276 501, EP-A-0 249 201 or WO 97/12945; crosslinked polymeric microparticles, as disclosed for example in EP-A-0 008 127; inorganic phyllosilicates, preferably smectites, especially montmorillonites and hectorites, such as aluminum-magnesium silicates, sodium-magnesium and sodium-magnesium-fluorine-lithium phyllosilicates of the montmorillonite type or inorganic phyllosilicates such as aluminum-magnesium silicates, sodium-magnesium and sodium-magnesium-fluorine-lithium phyllosilicates of the montmorillonite type (for further details refer to the book by Johan Bielemann, "Lackadditive", Wiley-VCH, Weinheim, N.Y., 1998, pages 17 to 30); silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride or ethylene-maleic anhydride copolymers and their derivatives or hydrophobically modified polyacrylates; or associative thickeners based on polyurethane, as described in Römpp Lexikon Lacke und Druckfarben, Georg Thieme Verlag, Stuttgart, New York, 1998, "Thickeners", pages 599 to 600, and in the textbook "Lackadditive" by Johan Bieleman, Wiley-VCH, Weinheim, New York, 1998, pages 51 to 59 and 65; and/or flame retardants.

Further examples of suitable coatings additives are described in the textbook "Lackadditive" by Johan Bieleman, Wiley-VCH, Weinheim, N.Y., 1998.

The aqueous basecoat materials preferably have at spray viscosity a solids content of from 5.0 to 60%, more preferably from 10 to 60%, with particular preference from 13 to 60% and in particular from 13 to 55% by weight, based in each case on the overall weight of the respective aqueous basecoat material.

The preparation of the aqueous basecoat material has no special features but instead takes place in a customary and known manner by mixing of the above-described constituents in appropriate mixing equipment such as stirred tanks, dissolvers or extruders in accordance with the techniques suitable for preparing the respective aqueous basecoat materials.

For the process of the invention, all customary and known clearcoat materials are used, which is a particular advantage of the process of the invention.

Examples of suitable known one-component (1K), two-component (2K) or multicomponent (3K, 4K) clearcoat materials are known from patents DE-A-42 04 518, U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071, EP-A-0 594 142, EP-A-0 604 992, WO 94/22969, EP-A-0 596 460 or WO 92/22615.

One-component (1K) clearcoat materials comprise, as is known, hydroxyl-containing binders and crosslinking agents such as blocked polyisocyanates, tris(alkoxycarbonylamino) triazines and/or amino resins. In a further variant they contain as binders polymers containing pendant carbamate and/or allophanate groups, and carbamate- and/or allophanate-modified amino resins as crosslinking agents (cf. U.S. Pat. No. 5,474,811, U.S. Pat. No. 5,356,669, U.S. Pat. No. 5,605,965, WO 94/10211, WO 94/10212, WO 94/10213, EP-A-0 594 068, EP-A-0 594 071 or EP-A-0 594 142).

The essential constituents present in two-component (2K) or multicomponent (3K, 4K) clearcoat materials are known to be hydroxyl-containing binders and polyisocyanate crosslinking agents, which are stored separately up until they are used.

Examples of suitable powder clearcoat materials are, for example, known from German patent DE-A-42 22 194 or from the BASF Lacke+Farbe AG product information bulletin "Pulverlacke", 1990.

Powder clearcoat materials include as their essential constituents, as known, binders containing epoxide groups and polycarboxylic acid crosslinking agents.

Examples of suitable powder slurry clearcoat materials are known, for example, from U.S. Pat. No. 4,268,542, international patent application WO 96/32452, and German patent applications DE-A-195 18 392.4 and DE-A-196 13 547, or are described in German patent application DE-A-198 14 471.7, unpublished at the priority date of the present specification.

Powder slurry clearcoat materials comprise, as is known, power clearcoat materials in dispersion in an aqueous medium.

UV-curable clearcoat materials are disclosed, for example, in patents EP-A-0 540 884, EP-A-0 568 967 or U.S. Pat. No. 4,675,234.

Powder slurry clearcoat materials offer particular advantages for the multicoat color and/or effect paint system of the invention and are therefore used with particular preference in accordance with the invention.

The multicoat color and/or effect paint systems produced by means of the process of the invention exhibit an outstanding profile of properties which is very well balanced in terms of mechanics, optics, corrosion resistance, and adhesion. Thus the multicoat paint systems of the invention possess the high optical quality and intercoat adhesion required by the market and do not give rise to any problems such as deficient condensation resistance, cracking (mud cracking) or leveling defects or surface textures in the clearcoats.

In particular, the multicoat paint systems exhibit an outstanding metallic effect, an excellent D.O.I. (distinctiveness of the reflected image), and an outstanding surface smoothness. They are weathering-stable, resistant to chemicals and bird droppings, are mar resistant, and exhibit very good reflow behavior.

Not least, however, it proves to be a very special advantage that in the production of the multicoat paint systems no cracking or popping marks now result even when the aqueous basecoat films are overcoated with powder slurry clearcoat materials and subsequently baked together with them. By this means it is possible to combine the particular advantages of aqueous basecoat materials with the particular advantages of powder slurry clearcoat materials. Moreover, these very same multicoat color and/or effect paint systems of the invention prove to be particularly firmly adhering, even when used as refinishes. Accordingly, the substrates coated with them also have particular advantages such as a longer service life, a better aesthetic impression for the viewer, and a better technological usefulness, so making them particularly attractive economically in particular for the OEM finishing of automobiles.

As well as being used in the process of the invention, the polyurethanes (B) of the invention may also be used per se for preparing coating materials, especially surface coating materials, adhesives, and sealing compounds. where the polyurethanes (B) are hydrophilic, it is of advantage in accordance with the invention to use them as a dispersion in an aqueous medium. The resulting polyurethane dispersions (B) of the invention are likewise outstandingly suited to preparing aqueous coating materials, adhesives, and sealing compounds.

The graft copolymers of the invention may be isolated from the primary dispersions in which they are produced and may be passed on for a very wide variety of end uses, especially in solventborne, water- and solvent-free pulverulent solid or water- and solvent-free liquid coating materials, adhesives, and sealing compounds. In accordance with the invention, however, it is of advantage to use the primary dispersions as such to prepare aqueous coating materials, adhesives, and sealing compounds.

In addition to the polyurethanes (B) of the invention and/or the graft copolymers of the invention, the aqueous adhesives of the invention may comprise further suitable customary and known constituents in effective amounts. Examples of suitable constituents are the crosslinking agents and additives described above, provided they are suitable for preparing adhesives.

In addition to the polyurethanes (B) of the invention and/or the graft copolymers of the invention, the aqueous sealing compounds of the invention may likewise comprise further suitable customary and known constituents in effective amounts. Examples of suitable constituents are likewise the crosslinking agents and additives described above, provided they are suitable for preparing sealing compounds.

The primary dispersions of the graft copolymers of the invention are especially suitable for preparing the aqueous coating materials of the invention, especially the aqueous paint materials of the invention. Examples of aqueous paint materials of the invention are surfacers, solid-color topcoats, aqueous basecoats, and clearcoats. The primary dispersions of the invention develop very particular advantages when used to prepare the aqueous basecoats of the invention.

This extremely broad usefulness of the polyurethanes (B) of the invention, of the polyurethane dispersions (B) of the invention, of the graft copolymers of the invention and of their primary dispersions of the invention, which goes well beyond the bounds of the process of the invention, constitutes a further particular advantage of the present invention.

EXAMPLES AND COMPARATIVE EXPERIMENTS

Preparation Example 1

The Preparation of an Inventively Useful Polyurethane (B)

In a reaction vessel equipped with stirrer, internal thermometer, reflux condenser and electrical heating, 692.7 parts by weight of a linear polyester polyol (prepared from dimerized fatty acid (Pripol® 1013), isophthalic acid and 1,6-hexanediol) having a hydroxyl number of 80 and a number-average molecular weight of 1400 daltons, 98.4 parts by weight of dimethylolpropionic acid and 50.1 parts by weight of trimethylolpropane monoallyl ether were dissolved in 431 parts by weight of methyl ethyl ketone and 91 parts by weight of N-methylpyrrolidone. After the solution had been heated to 45° C., 383.7 parts by weight of isophorone diisocyanate were added. After the exothermic reaction had subsided, the reaction mixture was slowly heated to 80° C. with stirring. It was stirred further at this temperature until the free isocyanate group content remained constant at 1.1 to 1.3% by weight. The reaction mixture was then cooled to 50° C. and 12 parts by weight of N-(aminoethyl)ethanolamine were added. The resulting reaction mixture was stirred at 50° C. until the free isocyanate group content was constant at 0.6 to 0.7% by weight. Then 17 parts by weight of methyl ethyl ketoxime were added and the resulting reaction mixture was stirred at 60° C. until the free isocyanate group content was 0.1% by weight or until free isocyanate groups were no longer detectable. Then, at 50° C., 145 parts by weight of methoxypropanol and 52 parts by weight of dimethylethanolamine were added. 30 minutes after adding the amine, the degree of neutralization was determined and adjusted if necessary to 80±1%. Thereafter, 2100 parts by weight of deionized water were added with stirring over the course of 30 minutes. The methyl ethyl ketone was removed from the resulting dispersion by distillation under reduced pressure at 60° C. After that, any losses of solvent and of water were compensated. The resultant dispersion of the polyurethane (B) for inventive use had a solids content of 23.5% by weight (one hour at 130° C.), a pH of 7.3 and an acid number of 34.6 mg KOH/g.

Preparation Example 2

The Preparation of the Primary Dispersion of an Inventively Useful Graft Copolymer 1

1615.2 parts by weight of the polyurethane dispersion (B) from preparation example 1 were diluted with 736.2 parts by weight of deionized water and heated to 85° C. At this temperature, a mixture of 150.2 parts by weight of styrene, 150.2 parts by weight of methyl methacrylate, 112.4 parts by weight of n-butyl acrylate and 112.4 parts by weight of hydroxyethyl methacrylate was added to the dispersion at a uniform rate over the course of 3.5 hours with stirring. At the same time as commencement of the addition of the monomer mixture, a solution of 7.9 parts by weight of tert-butyl peroxyethylhexanoate in 115.5 parts by weight of methoxypropanol was added over the course of 4 hours. The resulting reaction mixture was stirred at 85° C. until all of the monomers had reacted, with small amounts of additional initiator being added. The weight ratio of polyurethane (B) to methacrylate copolymer (A) was 1:1. The resulting primary dispersion of the graft copolymer had a very good storage stability. Its solids content was 34.7% by weight (one hour at 130° C.) and its pH was 7.2.

Comparative Experiment C1

The Preparation of a Known Polyurethane Containing Ethenylarylene Groups

A hydroxyl-containing polyester was prepared in accordance with the instructions given in patent EP-A-0 608 021, page 6 lines 22 to 37 (intermediate A). For this purpose, a mixture of 236 parts by weight of 1,6-hexanediol, 208 parts by weight of neopentyl glycol, 616 parts by weight of hexahydrophthalic anhydride and 6 parts by weight of benzyltriphenylphosphonium chloride was charged to an appropriate reaction vessel and heated to 120° C. under nitrogen and with stirring. After one hour at this temperature, the reaction mixture was heated to 140° C. Subsequently, 1000 parts by weight of the glycidyl ester of 1,1-dimethyl-1-heptanecarboxylic acid (Cardura® E-10 from Shell) were metered in over two hours. After four hours, the reaction mixture had an acid number of 8.5 mg KOH/g. A further 80 parts by weight of Cardura® E-10 were added. After another two hours, the acid number of the reaction mixture was less than 1 mg KOH/g.

In accordance with the instructions given on page 7 lines 1 to 27 (Example I) of patent EP-A-0 608 021, 261.6 parts by weight of the above-described polyester, 55 parts by weight of N-methylpyrrolidone and 0.1 part by weight of dibutyltin diacetate were taken as initial charge. 72.1 parts by weight of isophorone diisocyanate were metered into this mixture over the course of one hour at 90° C. After two hours at 90° C., the reaction mixture was heated to 100° C. At this temperature, 16.3 parts by weight of TMI®1 were metered in over 15 minutes. The resulting reaction mixture was held at a hundred ° C. for one hour.

Thereafter, the reaction mixture was heated to 130° C. and at this temperature a mixture of 38.2 parts by weight of styrene, 9.2 parts by weight of methyl methacrylate, 33.1 parts by weight of acrylic acid, 66 parts by weight of Cardura® E-10, 2.7 parts by weight of dicumyl peroxide, 0.8 part by weight of 3-mercaptopropionic acid and 51.9 parts by weight of 2-butoxyethanol was added over the course of one hour under nitrogen and with stirring. The resulting reaction mixture was held at this temperature for three hours. Subsequently, at 115° C., 18.1 parts by weight of dimethylethanolamine were metered in. After the mixture had cooled to 90° C., 782 parts by weight of deionized water were metered in dropwise with stirring over three hours, giving a secondary dispersion having a solids content of 35.8% by weight.

Preparation Examples 3 to 5 and Comparative Experiments C2 and C3

The Preparation of Inventively Useful Aqueous Basecoat Materials (Preparation Examples 3 to 5) and Inventively Non-Useful Aqueous Basecoat Materials (Comparative Experiments C2 and C3)

For preparation examples 3 to 5, 9.5 parts by weight of deionized water were charged to a mixing vessel. With stirring, 10.5 parts by weight of an aqueous acrylate dispersion [component (i) in accordance with patent DE-A-197 36 535; Acronal® 290 D from BASF Aktiengesellschaft], 13.5 parts by weight of the inventive primary dispersion of example 2, 10.4 parts by weight of the thickener 1 (paste of a synthetic sodium-magnesium phyllosilicate from Laporte, 3% in water), 8.0 parts by weight of deionized water, 0.28 parts by weight of a 15% strength aqueous ammonia solution and 18.0 parts by weight of the thickener 2 (3% strength aqueous solution of a polyacrylic acid thickener from Allied Colloids) were added.

Subsequently, with stirring, 4.2 parts by weight of a pigment paste having a carbon black content of 10% by weight and containing 60% by weight of the acrylated polyurethane dispersion in accordance with example D of patent DE-A-44 37 535, 10.2 parts by weight of a filler paste having an Aerosil content of 10% by weight and containing 50% by weight of the acrylated polyurethane dispersion in accordance with example D of patent DE-A-44 37 535, 2.0 parts by weight of butyl glycol and 3.5 parts (preparation example 3) or 2.0 parts (preparation example 4) by weight of a methanol- and butanol-etherified melamine resin from CYTEC were added. For preparation example 5, no melamine resin was added.

In a separate mixing vessel, a mixture of 0.4 parts by weight of a commercial aluminum bronze (Alu-Stapa Hydrolux® from Eckart, Al content 65% by weight) and 0.6 parts by weight of butyl glycol was stirred together. This mixture was subsequently added in portions and with vigorous stirring to the other mixture.

In a further separate mixer, 1.3 parts by weight of a pearlescent pigment (Iriodin® 9103 Sterling Silber WR from Merck) and 2.3 parts by weight of butyl glycol were mixed. This mixture was subsequently added in portions, again with vigorous stirring, to the mixture described above.

Table 1 gives an overview of the composition of the inventively useful aqueous basecoat materials of preparation examples 3 to 5.

For comparative experiment C2, preparation example 3 was repeated but replacing the inventively useful primary dispersion of preparation example 2 by the aqueous polyurethane resin dispersion of example 1 of patent DE-A-43 39 870 [component (ii)].

For comparative experiment C3, preparation example 3 was repeated but replacing the inventive primary dispersion of preparation example 2 by the known secondary dispersion of comparative experiment C1.

The material composition of the inventively non-useful aqueous basecoat materials C3 and C2 is likewise given in table 1.

TABLE 1

The composition of the inventively useful aqueous basecoat materials (preparation examples 3 to 5) and of the inventively non-useful aqueous basecoat materials (comparative experiments C2 and C3)

| Constituents | Comparative experiments: | | Preparation Example: | | |
| --- | --- | --- | --- | --- | --- |
| | C2 | C3 | 3 | 4 | 5 |
| Deionized water | 9.5 | 9.5 | 9.5 | 9.5 | 9.5 |
| Component (i) | 10.5 | 10.5 | 10.5 | 10.5 | 10.5 |
| Component (ii) | 13.5 | — | — | — | — |
| Secondary dispersion C1 | — | 13.5 | — | — | — |
| Primary dispersion (p. ex. 2) | — | — | 13.5 | 13.5 | 13.5 |
| Thickener 1 | 10.4 | 10.4 | 10.4 | 10.4 | 10.4 |
| Deionized water | 8.0 | 8.0 | 8.0 | 8.0 | 8.0 |
| Ammonia solution | 0.28 | 0.28 | 0.28 | 0.28 | 0.28 |
| Thickener 2 | 18.0 | 18.0 | 18.0 | 18.0 | 18.0 |
| Pigment paste | 4.2 | 4.2 | 4.2 | 4.2 | 4.2 |
| Filler paste | 10.2 | 10.2 | 10.2 | 10.2 | 10.2 |
| Butyl glycol | 2.0 | 2.0 | 2.0 | 2.0 | 2.0 |
| Melamine resin | 3.5 | 3.5 | 3.5 | 2.0 | — |

TABLE 1-continued

The composition of the inventively useful aqueous basecoat materials (preparation examples 3 to 5) and of the inventively non-useful aqueous basecoat materials (comparative experiments C2 and C3)

| Constituents | Comparative experiments: | | Preparation Example: | | |
|---|---|---|---|---|---|
| | C2 | C3 | 3 | 4 | 5 |
| Aluminum paste | 0.4 | 0.4 | 0.4 | 0.4 | 0.4 |
| Butyl glycol | 0.6 | 0.6 | 0.6 | 0.6 | 0.6 |
| Iriodin 9103 | 1.3 | 1.3 | 1.3 | 1.3 | 1.3 |
| Butyl glycol | 2.3 | 2.3 | 2.3 | 2.3 | 2.3 |

The viscosity of the aqueous basecoat materials of table 1 was adjusted using deionized water to from 90 to 95 mPas at a shear rate of 1000/s.

Examples 1 to 3 and Comparative Experiments C4 and C5

The Preparation of Multicoat Paint Systems by the Inventive Process (Examples 1 to 3) and by the Noninventive Process (Comparative Experiments C4 and C5)

The multicoat paint system of example 1 was prepared using the aqueous basecoat material of preparation example 3 (cf. table 1).

The multicoat paint system of example 2 was prepared using the aqueous basecoat material of preparation example 4 (cf. table 1).

The multicoat paint system of example 3 was prepared using the aqueous basecoat material of preparation example 5 (cf. table 1).

The multicoat paint system of comparative experiment C4 was prepared using the aqueous basecoat material of comparative experiment C2 (cf. table 1).

The multicoat paint system of comparative experiment C5 was prepared using the aqueous basecoat material of comparative experiment C3 (cf. table 1).

A. The Preparation of the Test Panels:

For examples 1 to 3 and the comparative experiments C4 and C5, test panels were first of all prepared. This was done by coating steel panels (bodywork panels), which had been coated with a customary and known cathodically deposited and baked electrodeposition coating, with a commercial thin-film surfacer (Ecoprime® 60 from BASF Coatings AG; anthracite-colored), after which the resulting surfacer film was flashed off at 20° C. and a relative atmospheric humidity of 65% for five minutes and dried at 80° C. in a forced-air oven for five minutes. Subsequently, the surfacer film had a dry film thickness of 15 μm.

Following the cooling of the test panels to 20° C., the aqueous basecoat materials of table 1 were applied, flashed off at 20° C. and a relative atmospheric humidity of 65% for five minutes and dried at 80° C. in a forced-air oven for five minutes, so that the dried basecoat films had a dry film thickness of approximately 15 μm.

After the test panels had again been cooled to 20° C., the basecoat films were overcoated with a powder slurry clearcoat material in accordance with international patent application WO 96/32452. The resulting powder slurry clearcoat films were flashed off at 20° C. and a relative atmospheric humidity of 65% for 3 minutes, and dried at 55° C. in a forced-air oven for five minutes. The dry film thickness of the resulting clearcoat films was from 55 to 57 μm.

Following the application of all three films, they were baked jointly at 155° C. for 30 minutes, to give the multicoat paint systems of examples 1 to 3 and the multicoat paint systems of the comparative experiments C4 and C5.

B. The Production of Refinish Coats:

To simulate the refinishing of the entire body on the line (line refinish), the test panels from examples 1 to 3 and from the comparative experiments C4 and C5 were roughened with a 1200 grit abrasive paper and, in accordance with the instructions described above, were coated again with the same multicoat paint system in each case (double coating).

C. The Determination of the Popping Limit and Cracking Limit (Mud Cracking):

In accordance with the instructions given in section A. above, multicoat paint systems were produced in which the basecoats were applied in a wedge from 3 to 40 μm. The clearcoats had a coat thickness of from 55 to 57 μm. The cracking limit and popping limit indicate the coat thickness above which surface defects (in this case popping marks and mud cracking) appear in the clearcoat. The cracking limit and the popping limit are a measure of the compatibility of the aqueous basecoat material with the clearcoat material, or of the basecoat with the clearcoat; the higher the cracking limit or the popping limit, the better the compatibility. The corresponding results are given in table 2.

D. The Testing of the Clearcoat Adhesion:

The clearcoat adhesion was tested on unstressed test panels [cf. section A. above (original finish) and section B. above (refinish)] after three days of storage at room temperature. For this purpose, using a knife or a pointed mandrel, the multicoat paint systems were scored down to the steel surface. The score marks were then subjected to a jet of water under high pressure for one minute (high-pressure cleaner from Kärcher), the water pressure being 230 bar, the water temperature 20° C., and the distance of the rotating spray nozzle from the test panels 6 cm. Assessment was made visually: if the multicoat paint system showed no damage, it was assessed as being "satisfactory" (sat.). If delamination occurred, this was assessed as being "unsatisfactory" (unsat.). The results are likewise given in table 2.

E. The Testing of the Intercoat Adhesion after Ball Shot Testing:

Ball shot testing was carried out in accordance with the DaimlerChrysler specification, which is general knowledge among those skilled in the art. The corresponding results are likewise given in table 2.

F. The Testing of the Intercoat Adhesion after Constant Condensation Climate Exposure to DIN 50017:

The test panels produced in accordance with the instructions indicated in section A. were subjected to the constant condensation climate of DIN 50017. Subsequently, after 0 and 2 hours of regeneration, the intercoat adhesion was determined using the cross-cut test in accordance with DIN EN ISO 2409. The results are likewise given in table 2.

TABLE 2

The results of the tests of sections C. to F.

| Tests | Comparative experiments: | | Example: | | |
|---|---|---|---|---|---|
| | C4 | C5 | 3 | 4 | 5 |
| Section C.: | | | | | |
| Popping limit (μm): | 23 | 15 | 28 | 27 | 29 |
| Cracking limit (μm): | 28 | 9.0 | 36 | 34 | 38 |
| Section D.: | | | | | |
| Water jet test: | unsat. | unsat. | sat. | sat. | sat |
| Section E.: | | | | | |
| Ball shot testing: | | | | | |
| Original finish | 7/1 | 12/0 | 6/1 | 8/1 | 7/1 |
| Refinish | 17/0 | 3.3/0 | 16/1 | 17/1 | 15/1 |
| Section F.: | | | | | |
| Cross-cut test: | | | | | |
| After 0 hours' regeneration | GT0 | GT3 | GT0 | GT0 | GT0 |
| After 2 hours' regeneration | GT0 | GT1–2 | GT0 | GT0 | GT0 |

The results of table 2 demonstrate that the multicoat paint system of examples 1 to 3 produced by the inventive process were clearly superior, in terms of the compatibility of aqueous basecoat and powder slurry clearcoat, and the intercoat adhesion, to the multicoat paints systems of comparative experiments C4 and C5, not produced by the inventive process. Also underscored is the fact that, in the multicoat paint system of comparative experiment C5, the aqueous basecoat material of comparative experiment C3 was not compatible with the powder slurry clearcoat material, which is why the multicoat paint C5 also had very poor individual impact resistance and poor intercoat adhesion. Moreover, the results of table 2 demonstrate that, owing to the inventive use of graft copolymers with blocked isocyanate groups it was possible to omit entirely the crosslinking agent (melamine resin) without detriment to the profile of properties in the multicoat paint systems. In fact, the contrary was the case: in the multicoat paint system of example 3 based on the melamine-resin-free aqueous basecoat material of preparation example 5, an improvement was in fact observed over the multicoat paint systems of examples 1 and 2 based on the melamine-resin-containing aqueous basecoat materials of preparation example 3 and 4.

The invention claimed is:

1. A hydrophilic or hydrophobic self-crosslinking polyurethane (B) comprising on average per molecule at least one pendant olefinically unsaturated group or a mixture of at least one pendant olefinically unsaturated group with at least one terminal olefinically unsaturated group, and at least one pendant blocked isocyanate group, and which is the reaction product of:
   (1) a polyurethane prepolymer (B1) comprising on average per molecule at least one pendant olefinically unsaturated group or a mixture of at least one pendant olefinically unsaturated group with at least one terminal olefinically unsaturated group, at least one pendant blocked isocyanate group, and at least one free isocyanate group; and
   (2) at least one material selected from the group consisting of blocking agent (B1.7), compounds containing at least two isocyanate-reactive functional groups (B1.8), and mixtures thereof so that free isocyanate groups are no longer detectable;

wherein the olefinically unsaturated groups are (meth)acrylate, ethacrylate, crotonate, cinnamate, vinyl ether, vinyl ester, dicyclopentadienyl, norbornenyl, isoprenyl, isopropenyl, allyl, butenyl, isoprenyl ether, isopropenyl ether, allyl ether, butenyl ether, isoprenyl ester, isopropenyl ester, allyl ester, butenyl ester, ethenylarylene of the general formula (I):

$$CH_2=C(CH_3)-C_6H_4-$$ (I)

in which $-C_6H_4-$ is a 1,2-, 1,3- or 1,4-phenylene radical, or a combination comprising at least one of the foregoing olefinically unsaturated groups; and wherein the polyurethane prepolymer (B1) is prepared by reacting:
(B1.1) at least one polyisocyanate;
(B1.2) at least one polyol;
(B1.3) at least one compound comprising at least one blocked isocyanate group and at least two isocyanate-reactive functional groups with the proviso that (B1.3) is not the reaction product of a trimethylolpropane; and
(B1.4) at least one compound comprising at least one olefinically unsaturated group and at least two isocyanate-reactive functional groups;
in at least one stage such that on average per molecule there remains at least one free isocyanate group.

2. The hydrophilic self-crosslinking polyurethane (B) of claim 1, wherein the polyurethane prepolymer (B1) is prepared by reacting (B1.1), (B1.2), (B1.3), (B1.4), and also (B1.5) at least one compound comprising at least one hydrophilic functional group and at least two isocyanate-reactive functional groups.

3. The hydrophilic or hydrophobic self-crosslinking polyurethane (B) of claim 1, wherein the polyurethane prepolymer (B1) is reacted with at least one blocking agent.

4. The hydrophilic or hydrophobic self-crosslinking polyurethane (B) of claim 3, wherein the at least one blocking agent is a ketoxime.

5. The hydrophilic self-crosslinking polyurethane (B) of claim 1, wherein (B1.2) is at least one diol.

6. The hydrophilic self-crosslinking polyurethane (B) of claim 1, wherein (B1.3) has one blocked isocyanate group.

7. The hydrophilic self-cross-linking polyurethane (B) of claim 6 wherein (B1.3) has two isocyanate-reactive groups.

8. The hydrophilic self-cross-linking polyurethane (B) of claim 1 wherein (B1.3) has two isocyanate-reactive groups.

9. The self-crosslinking polyurethane (B) of claim 1 wherein the polyurethane prepolymer (B1) comprises (B1.2) a polyester polyol or a polyether polyol.

10. The self-crosslinking polyurethane (B) of claim 9 wherein the polyester polyol (B1.2) is a polyether polyol or a saturated or olefinically unsaturated polyester prepared by reacting a polyol with a polymeric fatty acid or by reacting a diol with a lactone.

11. The self-crosslinking polyurethane (B) of claim 10 wherein the polyester polyol (B1.2) is an olefinically unsaturated polyester prepared from a polymeric fatty acid.

12. The self-cross-linking polyurethane (B) of claim 1 wherein the compound (B1.4) is trimethylolpropane monoallyl ether.

13. The self-crosslinking polyurethane (B) of claim 1 wherein the polyurethane prepolymer (B1) contains terminal free isocyanate groups that are reacted with the material (B1.8) containing at least two isocyanate-reactive functional groups.

14. The self-crosslinking polyurethane (B) of claim 13 wherein the material (B1.8) is a polyamine or amino alcohol.

15. A hydrophilic or hydrophobic self-crosslinking polyurethane (B) comprising on average per molecule at least one pendant olefinically unsaturated group or a mixture of at least one pendant olefinically unsaturated group with at least one terminal olefinically unsaturated group, and at least one pendant blocked isocyanate group, and which is the reaction product of:

(1) a polyurethane prepolymer (B1) comprising on average per molecule at least one pendant olefinically unsaturated group or a mixture of at least one pendant olefinically unsaturated group with at least one terminal olefinically unsaturated group, at least one pendant blocked isocyanate group, and at least one free isocyanate group; and (2) at least one material selected from the group consisting of blocking agent (B1.7), compounds containing at least two isocyanate-reactive functional groups (B1.8), and mixtures thereof so that free isocyanate groups are no longer detectable;

wherein the olefinically unsaturated groups are (meth) acrylate, ethacrylate, crotonate, cinnamate, vinyl ether, vinyl ester, dicyclopentadienyl, norbornenyl, isoprenyl, isopropenyl, allyl, butenyl, isoprenyl ether, isopropenyl ether, allyl ether, butenyl ether, isoprenyl ester, isopropenyl ester, allyl ester, butenyl ester, ethenylarylene of the general formula (I):

$$CH_2=C(CH_3)-C_6H_4-\qquad(I)$$

in which $-C_6H_4-$ is a 1,2-, 1,3- or 1,4-phenylene radical, or a combination comprising at least one of the foregoing olefinically unsaturated groups; and wherein the polyurethane prepolymer (B1) is prepared by reacting:

(B1.1) at least one polyisocyanate;

(B1.2) a polyester polyol that is an olefinically unsaturated polyester prepared by reacting a polyol with a polymeric fatty acid;

(B1.3) at least one compound comprising at least one blocked isocyanate group and at least two isocyanate-reactive functional groups with the proviso that (B1.3) is not the reaction product of a trimethylolpropane; and (B1.4) trimethylolpropane nonallyl ether;

in at least one stage such that on average per molecule there remains at least one free isocyanate group; wherein the polyurethane prepolymer (B1) contains terminal free isocyanate groups that are reacted with the material (B1.8) containing at least two isocyanate-reactive functional groups selected from polyamines and amino alcohols.

* * * * *